United States Patent
Kang et al.

(10) Patent No.: US 9,479,911 B2
(45) Date of Patent: Oct. 25, 2016

(54) METHOD AND SYSTEM FOR SUPPORTING A TRANSLATION-BASED COMMUNICATION SERVICE AND TERMINAL SUPPORTING THE SERVICE

(71) Applicant: Samsung Electronics Co., Ltd, Gyeonggi-do (KR)

(72) Inventors: Sangki Kang, Gyeonggi-do (KR); Kyungtae Kim, Gyeonggi-do (KR); Woohyung Lim, Seoul (KR); Kwangsoo Jung, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 233 days.

(21) Appl. No.: 14/188,542

(22) Filed: Feb. 24, 2014

(65) Prior Publication Data

US 2014/0242955 A1   Aug. 28, 2014

(30) Foreign Application Priority Data

Feb. 22, 2013   (KR) .................. 10-2013-0019423

(51) Int. Cl.
| | | |
|---|---|---|
| *H04L 29/08* | (2006.01) | |
| *H04W 4/18* | (2009.01) | |
| *G06F 17/28* | (2006.01) | |
| *G10L 13/00* | (2006.01) | |
| *G10L 15/26* | (2006.01) | |
| *H04W 4/14* | (2009.01) | |
| *H04L 12/58* | (2006.01) | |

(52) U.S. Cl.
CPC ............. *H04W 4/18* (2013.01); *G06F 17/289* (2013.01); *H04L 67/2823* (2013.01); *G10L 13/00* (2013.01); *G10L 15/26* (2013.01); *H04L 51/38* (2013.01); *H04L 67/14* (2013.01); *H04W 4/14* (2013.01)

(58) Field of Classification Search
CPC ......... H04W 4/02; H04W 4/12; H04W 4/14; H04W 8/18; H04W 88/184; G06F 17/289; G06F 17/2872; G06F 17/2827; G06F 17/2836; G06F 17/2818
USPC ....... 455/414.1, 414.2, 414.4, 466; 704/1, 2, 704/200, 235, 251, 277
See application file for complete search history.

(56) References Cited

U.S. PATENT DOCUMENTS

| | | | | |
|---|---|---|---|---|
| 6,075,842 | A * | 6/2000 | Engelke | H04M 3/42391 379/52 |
| 7,460,884 | B2 * | 12/2008 | Sinclair | H04M 1/72572 455/414.1 |
| 8,494,838 | B2 * | 7/2013 | Donabedian | G06F 17/289 704/8 |
| 8,855,996 | B1 * | 10/2014 | Van Dijke | G06Q 50/10 704/2 |
| 2004/0102957 | A1 * | 5/2004 | Levin | G06F 17/2735 704/3 |
| 2008/0288241 | A1 * | 11/2008 | Noda | G06F 17/2836 704/4 |
| 2008/0298309 | A1 * | 12/2008 | DePietro | H04W 4/10 370/328 |
| 2009/0076793 | A1 * | 3/2009 | Hoefelmeyer | G06F 17/289 704/3 |

* cited by examiner

*Primary Examiner* — Temica M Beamer

(57) ABSTRACT

The present disclosure relates to a method and a system for a translation-based communication service operation. The method includes: establishing a communication service channel between a transmitter-side terminal and a receiver-side terminal; translating at least one of a text of a first language and a voice signal in the first language collected by the transmitter-side terminal into a second language to generate at least one of a translation text of a second language and a translation voice in the second language; and receiving and outputting at least one of the generated translation text in the second language and the translation voice signal in the second language by the receiver-side terminal.

41 Claims, 28 Drawing Sheets

METHOD AND SYSTEM FOR SUPPORTING A TRANSLATION-BASED COMMUNICATION SERVICE AND TERMINAL SUPPORTING THE SERVICE

CROSS-REFERENCE TO RELATED APPLICATION(S) AND CLAIM OF PRIORITY

The present application is related to and claims priority from and the benefit under 35 U.S.C. §119(a) of Korean Patent Application No. 10-2013-0019423, filed on Feb. 22, 2013, which is hereby incorporated by reference for all purposes as if fully set forth herein.

TECHNICAL FIELD

The present invention relates to a translation-based communication service operation for a terminal, and more particularly, to a method and a system for a translation-based communication service operation, which support operation of a translation service for smooth communication between a transmitter side and a receiver side.

BACKGROUND

Portable terminals are very popular in various industrial and lifestyle fields since they are small enough to be carried while they can support specific user functions. Recently, portable terminals synthetically supporting various user functions have appeared. Each of these portable terminals supports the user functions and provides screens corresponding to the user functions through a display unit. Accordingly, a user can use a particular user function to consume contents through a screen according to operation of the particular user function.

Also, a portable terminal supports a voice communication, a Short Message Service (SMS) communication, a video communication, etc. with another portable terminal. To this end, when a user inputs a phone number of a counterpart terminal and selects one of a voice communication, an SMS communication, and a video communication and a user of the counterpart terminal then approves the selected communication service, the terminal can provide the selected communication service. The supported communication service as described above may include not only a communication service in a predetermined area in which the same language is used, but also between areas in which different languages are used. As a result, a communication between people using different languages is also supported in recent times. In the communication between people using different languages, a normal communication can be established when one party can understand the language of the other party. Especially when neither party can understand the language of the other party, a normal communication cannot be made even after the communication connection.

SUMMARY

To address the above-discussed deficiencies, it is a primary object to provide a method and a system for a translation-based communication service operation, which support conversion of input contents into a predetermined language and then provision of the converted contents, so as to enable communication between users using different languages.

An aspect of the present invention provides a method of supporting a translation-based communication service, which includes establishing a communication service channel between a transmitter-side terminal and a receiver-side terminal, translating at least one of a text of a first language and a voice signal in the first language collected by the transmitter-side terminal into a second language to generate at least one of a translation text of a second language and a translation voice in the second language; and receiving and outputting at least one of the generated translation text in the second language and the translation voice signal in the second language by the receiver-side terminal.

Another aspect of the present invention provides a receiver-side terminal for supporting a translation-based communication service, which includes a communication unit that receives a text of a first language, a storage unit that stores a translation database for conversion of the received text in the first language to a translation text of a second language, a display unit that outputs the translation text in the second language, and a controller that performs a control to convert the text in the first language to the translation text in the second language and then output the converted translation text.

Another aspect of the present invention provides a transmitter-side terminal for supporting a translation-based communication service, which includes at least one of an input unit supporting input of a text of a first language and a display unit having an input function; a storage unit that stores a translation database for translation of the text in the first language; a controller that controls conversion of the text in the first language to a translation text of a second language by using the translation database; and a communication unit that transmits the translation text in the second language.

Another aspect of the present invention provides a system for supporting a translation-based communication service, which includes: a transmitter-side terminal that establishes a communication service channel with a receiver-side terminal, translates at least one of a text of a first language and a voice signal in the first language collected by the transmitter-side terminal into a second language to generate at least one of a translation text of a second language and a translation voice in the second language, and transmits the generated at least one of the translation text and the translation voice; and the receiver-side terminal that outputs at least one of the translation text in the second language and the translation voice signal in the second language transmitted from the transmitter-side terminal.

Another aspect of the present invention provides a system for supporting a translation-based communication service, which includes a transmitter-side terminal that establishes a communication service channel with a receiver-side terminal and transmits at least one of a collected text of a first language and a collected voice signal in the first language, and the receiver-side terminal that converts at least one of the text in the first language and the voice signal in the first language transmitted from the transmitter-side terminal to at least one of a translation text of a second language and a translation voice in the second language, and outputs the converted at least one of the translation text and the translation voice signal.

Another aspect of the present invention provides a system for supporting a translation-based communication service, which includes: a transmitter-side terminal that establishes a chatting service channel with a receiver-side terminal and collects a text of a first language; an ASR/translation server that receives the text in the first language from the transmitter-side terminal and information of a second language of the receiver-side terminal and generates a translation text in the second language corresponding to the text in the first language based on the received information in the second language; a chatting server that receives a translation text in the second language and provides the received translation text to the receiver-side terminal; and the receiver-side terminal that receives and outputs the translation text in the second language.

Another aspect of the present invention provides a system for supporting a translation-based communication service, which includes a transmitter-side terminal that establishes a voice communication service channel with a receiver-side terminal and collects a voice signal of a first language; an ASR/translation server that receives the voice signal in the first language and information of a second language of the receiver-side terminal from the transmitter-side terminal, voice-recognizes the voice signal in the first language to generate a voice-recognized text, and convert the voice-recognized text to a translation text in the second language; and the receiver-side terminal that receives and outputs the translation text in the second language.

Another aspect of the present invention provides a system for supporting a translation-based communication service, which includes a transmitter-side terminal that establishes a voice communication service channel with a receiver-side terminal and collects a voice signal of a first language, an ASR server that receives and voice-recognizes the voice signal in the first language to generate a voice-recognized text; a translation server that converts the voice-recognized text to a translation text of a second language corresponding to information in the second language of the receiver-side terminal, and the receiver-side terminal that receives and outputs the translation text in the second language.

As described above, the method and system for a translation-based communication service operation according to the present invention can support proper translation and transfer of contents, so as to enable communication between users using different languages.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 28, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter, embodiments of the present invention will be described in detail with reference to the accompanying drawings.

In describing the exemplary embodiments of the present invention, descriptions related to technical contents which are well-known in the art to which the present invention pertains and are not directly associated with the present invention, will be omitted. Moreover, detailed descriptions related to configuration elements having substantially identical configurations and functions will be omitted.

For the same reason, in the accompanying drawings, some configuration elements may be exaggerated, omitted, or schematically shown, and a size of each element may not precisely reflect the actual size. Accordingly, the present invention is not restricted by a relative size or interval shown in the accompanying drawings.

Figure 1:
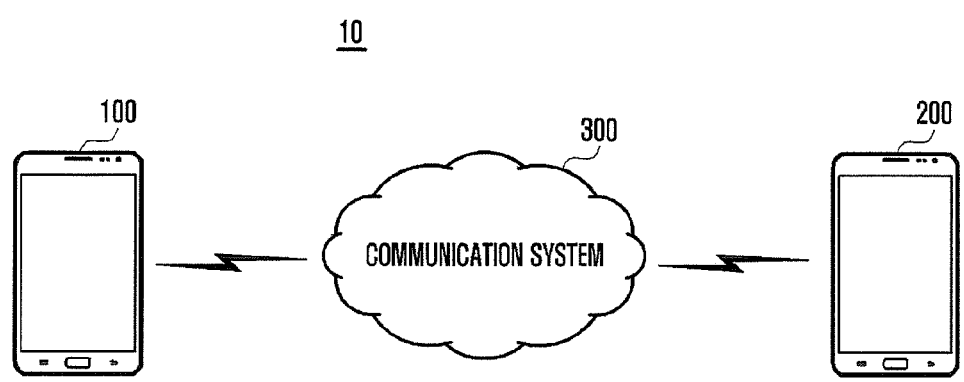
FIG. 1 is a diagram illustrating a translation-based communication service support system according to an embodiment of the present invention.

FIG. 1 is a diagram illustrating a translation-based communication service operation system according to an embodiment of the present invention.

Referring to FIG. 1, a translation-based communication service operation system 10 of the present invention includes a transmitter-side terminal 100, a communication system 300, and a receiver-side terminal 200.

The translation-based communication service support system 10 of the present invention having the construction as described above can support a translation-based communication service according to configurations established by users during operation of a communication service between the transmitter-side terminal 100 and the receiver-side terminal 200. Especially, the translation-based communication service support system 10 of the present invention supports translation of transmission information, which includes at least one of a voice signal, a text, and handwriting information input by the transmitter-side terminal 100, into information of a particular language and transmission of the translated information to the receiver-side terminal 200.

To this end, the transmitter-side terminal 100 establishes a packet switching system-based data communication channel with the receiver-side terminal 200. In this establishment, the translation-based communication service support system 10 can support operation of a translation function according to at least one of a user request from the transmitter-side terminal 100, a user request from the receiver-side terminal 200, and a configuration set by each terminal. For example, the transmitter-side terminal 100 transmits a message requesting establishment of a data communication channel for use of a chatting service with the receiver-side terminal 200 to the receiver-side terminal 200. Then, when a chatting service with the receiver-side terminal 200 is established, the transmitter-side terminal 100 translates transmission information, which includes at least one of a voice signal, a text, and handwriting information input by a transmitter-side user, into information of a language designated by the receiver-side terminal 200 to generate translation information. Further, the transmitter-side terminal 100 can transmit the translation information to the terminal receiver-side terminal 200. In this event, the transmitter-side terminal 100 can transmit at least one type of transmission information among a voice signal, a text, and handwriting information input by the user, together with the translation information, to the receiver-side terminal 200. Further, the transmitter-side terminal 100 can transmit the translation information either in the form of a text signal or after converting the translation information into a voice signal of a language designated by the receiver-side terminal 200. The transmitter-side terminal 100 generates and transmits transmission information by translating the transmission information into information of a language designated by the receiver-side terminal 200 when the transmitter-side terminal 100 is set in a translation mode. However, when the translation mode is in a deactivated state, the transmitter-side terminal 100 can directly transmit the transmission information to the receiver-side terminal 200 without translation.

Meanwhile, the receiver-side terminal 200 establishes a communication channel with the transmitter-side terminal 100 through the communication system 300. In this event, the receiver-side terminal 200 can establish a packet switching system-based data communication channel with the transmitter-side terminal 100. The data communication channel can be a channel for supporting at least one of various communication service channels, such as a video communication service channel, chatting service channel, and a communication service channel simultaneously supporting voice, video, and caption. When the receiver-side terminal 200 as described above receives translation information from the transmitter-side terminal 100, the terminal receiver-side terminal 200 can output the received translation information. In this event, the receiver-side terminal 200 supports outputting of voice type or text type translation information provided by the transmitter-side terminal 100.

Meanwhile, when the transmitter-side terminal 100 does not support or apply a translation mode, the receiver-side terminal 200 can receive untranslated transmission information from the transmitter-side terminal 100. Then, the receiver-side terminal 200 can perform a translation mode according to a configuration made by a user. That is, the receiver-side terminal 200 can translate the transmission information transmitted from the transmitter-side terminal 100 to generate translation information and then output the generated translation information. In this event, the receiver-side terminal 200 can generate and output at least one of voice type translation information and text type translation information. In addition, the translation information generated by the receiver-side terminal 200 can be transmitted to the transmitter-side terminal 100 either according to a configuration made by a user or in response to a request from the transmitter-side terminal 100.

The communication system 300 is disposed between the transmitter-side terminal 100 and the receiver-side terminal 200 and supports establishment of a communication channel between the transmitter-side terminal 100 and the receiver-side terminal 200. The communication system 300 can be configured by various types of communication network devices according to device characteristics of the transmitter-side terminal 100 and the receiver-side terminal 200. Especially, in order to provide translation information according to the present invention, the communication system 300 can be configured by a packet switching system capable of transmitting or receiving a packet, and can be either mixedly used together with a circuit switching system or independently configured. Further, when the transmitter-side terminal 100 and the receiver-side terminal 200 are arranged as mobile apparatuses, the communication system 300 can be configured as a mobile communication system in order to support the mobility of the terminals. For example, the communication system 300 can include network apparatuses supporting communication systems and communication schemes of various generations including the second generation (2G), the third generation (3G), and the fourth generation (4G). Therefore, it can be understood that the communication system 300 according to the present invention is at least one of various communication networks, each of which can be configured by a network apparatus capable of transmitting at least one of audio data, an image, and a text collected by the transmitter-side terminal 100 to the receiver-side terminal 200 and a network apparatus capable of transmitting at least one of audio data, an image, and a text collected by the receiver-side terminal 200 to the transmitter-side terminal 100.

In the translation-based communication service support system 10 according to an embodiment of the present invention as described above, the transmitter-side terminal 100 translates transmission information into a language of the receiver-side terminal 200 and then provides the translated information to the receiver-side terminal 200. Therefore, the translation-based communication service support system 10 can support normal communication between users of the terminals. Hereinafter, configurations and various operation examples of the translation-based communication service support system 10 will be described in more detail with reference to the accompanying drawings.

Figure 2:
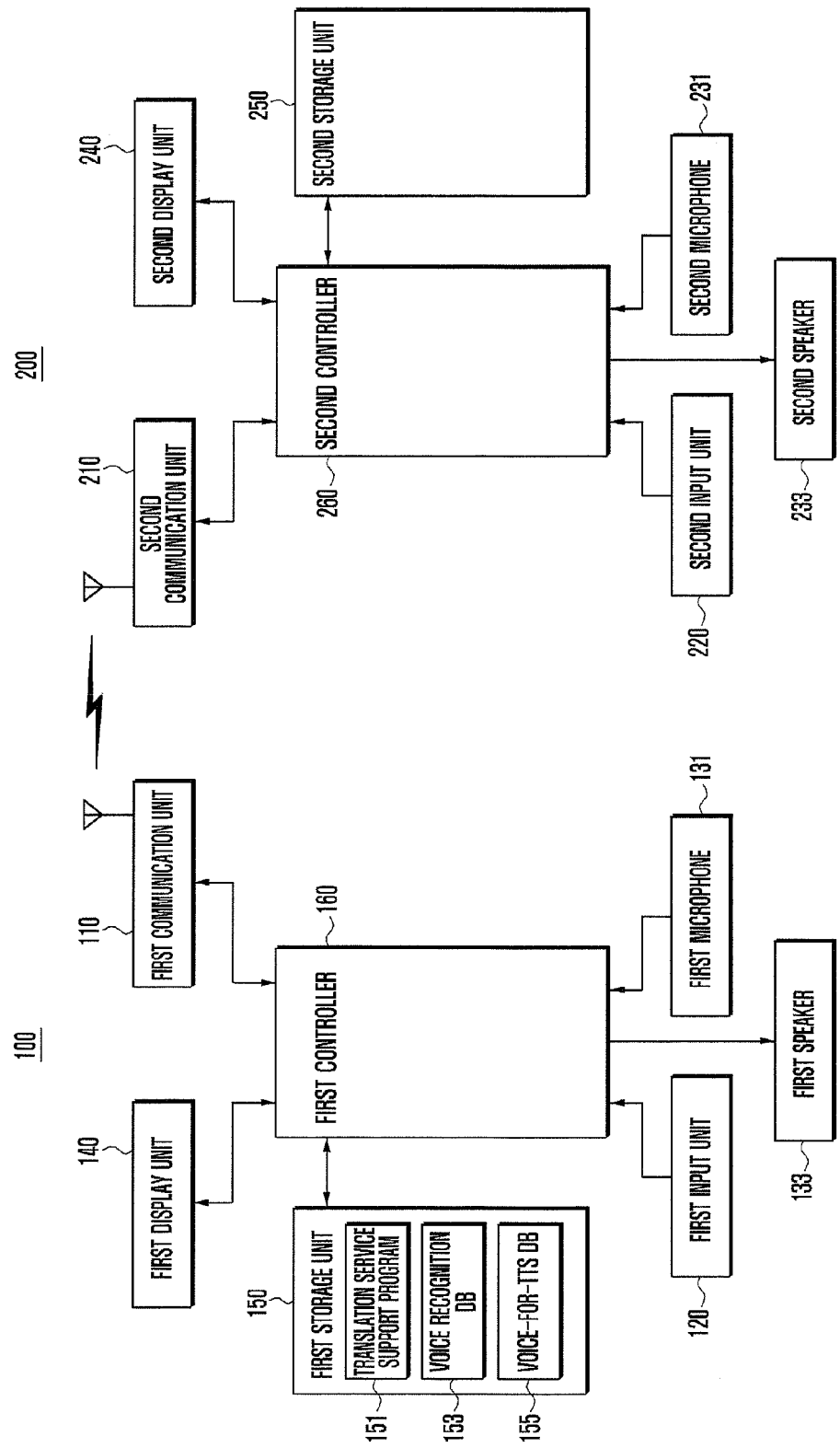
FIG. 2 is a block diagram illustrating the configuration of the transmitter-side terminal and the configuration of the receiver-side terminal of FIG. 1 in more detail.

FIG. 2 is a block diagram illustrating the configuration of the transmitter-side terminal 100 and the receiver-side terminal 200 in more detail among the configurations of terminals for operation of a translation-based communication service according to an embodiment of the present invention. In the following discussion, the transmitter-side terminal 100 and the receiver-side terminal 200 are described and illustrated as separate elements each having an individual function. However, the present invention is not limited thereto. In other words, in the process of using a translation-based communication service according to the present invention, the transmitter-side terminal 100 can perform the function of the receiver-side terminal 200 and the receiver-side terminal 200 can perform the function of the transmitter-side terminal 100. In result, the transmitter-side terminal 100 and the receiver-side terminal 200 can be integrally configured in a single communication terminal. Therefore, it should be understood that the configuration of the transmitter-side terminal 100 is a configuration which a particular terminal can have while performing a transmission function and the configuration of the receiver-side terminal 200 is a configuration which a particular terminal can have while performing a reception function Referring to FIG. 2, in order to support a communication service operation according to an embodiment of the present invention, the transmitter-side terminal 100 can include a first communication unit 110, a first input unit 120, a first microphone 131, a first speaker 133, a first storage unit 150, a first display unit 140, and a first controller 160.

In using a communication service with the receiver-side terminal 200, the transmitter-side terminal 100 having the construction described above according to the present invention can support a translation-based communication service operation function of the present invention when there is a user's configuration requesting translation into a particular language or a configuration language of the receiver-side terminal 200 is included in a list of languages configured to support the translation service or is different from a configuration language of the transmitter-side terminal 100. In this process, the transmitter-side terminal 100 supports conversion of a text signal collected based on a translation service support program 151 into translation information or collection of a voice signal and conversion of the collected voice signal to translation information. In the process of converting a voice signal to translation information, a voice signal of a first language can be first converted to a text signal and the converted text signal in the first language can be then converted to a text signal of a second language to generate translation information. In order to support the function described above, the transmitter-side terminal 100 can support a Speech To Text (STT) translation service for recognizing a voice signal collected by the first microphone 131 by using a voice recognition database stored in the first storage unit 150 or a voice recognition database server accessible through the first communication unit 110, converting the recognized voice signal to a text, and then converting the converted text again to a text of a second language. Further, the transmitter-side terminal 100 can support a Text To Speech (TTS) translation service for converting text information input by a user to a voice signal of a second language and then transmitting the converted voice signal to the receiver-side terminal 200.

The transmitter-side terminal 100 can provide at least one of the STT translation service and the TTS translation service while the chatting service or video communication service is used. In this event, the chatting service for chatting between the transmitter-side terminal 100 and the receiver-side terminal 200 can support at least one function among functions of transmitting or receiving a voice signal, an image, and a caption, as well as the text transmission/reception function, according to selection by users or previous schedule information, or under the control of the controller.

To this end, the first communication unit 110 can establish a data communication channel with the receiver-side terminal 200 through the communication system 300. The first communication unit 110 can be configured by communication modules supporting various types of communication schemes according to the device characteristics of the transmitter-side terminal 100. For example, the first communication unit 110 can include various communication modules, such as a mobile communication module supporting communication schemes of 2G, 3G, and 4G and a communication module supporting WiFi. Especially, the first communication unit 110 can establish a data communication channel for transmission/reception of a translation-based text according to an embodiment of the present invention with the receiver-side terminal 200 in response to an input from a user. The established data communication channel allows translation and transmission of at least one of a voice, an image, a text input through the first input unit 120 or the first display unit 140 having an input function, as well as a text generated through voice recognition. Further, the data communication channel allows conversion of a translation text, which has been translated from the text input through the first input unit 120 or the first display unit 140 having an input function, to a translation voice and then transmission of the translation voice. The first communication unit 110 can support the communication services described above either unidirectionally or bidirectionally in the process of supporting the communication service with the receiver-side terminal 200.

The first input unit 120 has a configuration for generating various input signals necessary for operation of the transmitter-side terminal 100. The first input unit 120 can have a particular key form, such as a button key, a side key, and a home key, and can be provided as a virtual touchpad in order to support a full touch screen. The virtual touchpad can be displayed on the first display unit 140 to support generation of an input event according to a user's touch.

The first input unit 120 can generate an input signal for connection of a communication service with the receiver-side terminal 200, an input signal for operation of a connected communication service, an input signal for input of letters, an input signal for indicating activation of another communication service during operation of a particular communication service, etc. according to a control of a user. Especially, in order to support a translation-based communication service, the first input unit 120 can generate an input signal for configuration of a translation mode, an input signal for designation of a particular language, or an input signal requesting collection of language information of the receiver-side terminal 200. A generated input signal is transferred to the first controller 160 to support a corresponding function of the input signal.

The first microphone 131 is activated according to the functional operation of the transmitter-side terminal 100 to collect an audio signal, especially a voice signal, from the surroundings. The voice signal collected by the first microphone 131 is transferred to the first controller 160. The transferred voice signal can be voice-recognized, converted into a text, and then converted into a particular language under the control of the first controller 160. Otherwise, the voice signal can be encoded in the state at the time of being collected and can be provided to a voice recognition server accessible through the first communication unit 110. Then, the voice signal can be converted to a text by the voice recognition server, converted into a particular language, and then transferred to the receiver-side terminal 200.

The first speaker 133 has a configuration supporting output of an audio signal from the transmitter-side terminal 100. The first speaker 133 can support outputting of audio data according to reproduction of an audio file stored in the transmitter-side terminal 100 and audio data according to reproduction of an audio file received from another terminal or an external server apparatus. Especially, the first speaker 133 can output audio data transmitted from the receiver-side terminal 200. Further, the first speaker 133 can output a corresponding alarm sound or guide sound in response to an SMS message or a video signal transmitted from the receiver-side terminal 200. The first speaker 133 according to the present invention can output an alarm sound notifying of transmission of a text translated into a particular language from a voice signal collected by the first microphone 131, an alarm sound notifying of reception of a translation text provided by the receiver-side terminal 200, a guide sound corresponding to a text received in response to an STT or TTS translation service from the receiver-side terminal 200, etc. under the control of the first controller 160.

The first display unit 140 has a configuration for providing various screen interfaces required for operation of the transmitter-side terminal 100. The first display unit 140 can have structure including a touch panel and a display panel in order to support a touch function. The first display unit 140 provides a synthetic screen or individual screens according to the types of communication services with the receiver-side terminal 200. For example, the first display unit 140 can individually output at least one screen among a screen for supporting a translation chatting service with the receiver-side terminal 200, a screen for supporting a translation voice service, a screen for supporting a translation SMS service, a screen for supporting a translation-based caption service, and a screen for supporting a video communication service, according to the operation of each communication service.

Otherwise, the first display unit 140 can provide a screen in which one or more combinations of the screens described above are synthetically configured. For example, the first display unit 140 can output an image or a text indicating that a translation voice service and a corresponding function are being supported, on a translation chatting service supporting screen as a background thereof. Further, the first display unit 140 can output an image display area for supporting a video communication service during outputting of a translation chatting service supporting screen, while outputting a text generated through voice recognition and a text translated into a particular language at one side thereof.

The first display unit 140 can provide a menu screen to enable a user to select at least one of the various communication services described above. The screens provided by the first display unit 140 can have various formats according to the size of the display area of the device. Further, the first display unit 140 can perform overlapping of various types of information or page shifting in order to output information in a limited display area especially in the case of a portable device.

The first storage unit 150 can store an operating system necessary for operation of the transmitter-side terminal 100, application programs for supporting the functions provided by the transmitter-side terminal 100, etc. Especially, the first storage unit 150 can store a translation service support program 151 for supporting a translation-based communication service operation of the present invention, a voice recognition database (DB) 153 for supporting internal voice recognition, and a voice-for-TTS DB 155 for supporting a translation TTS service.

The translation service support program 151 includes various routines for operation of a translation-based communication service according to an embodiment of the present invention. For example, the translation service support program 151 can include routines for forming and operating a chatting service channel with the receiver-side terminal 200, routines for forming and operating a voice service channel, routines for forming and operating an SMS channel, and routines for forming and operating a video communication service channel. Especially, the translation service support program 151 can include routines for converting an input text or input letters to a translated text or translated letters of a particular language and routines for recognizing an input voice signal based on the voice recognition DB 153, converting the input voice signal to a text, and then converting the converted text to a translated text. The translation service support program 151 can include routines for converting a received translated text to a translated voice and then outputting the converted translated voice and routines for converting a translated text to a translated voice and then transmitting the converted translated voice to the receiver-side terminal 200. In addition, when the translation service support program 151 is designed to use an external server, for example a voice recognition supporting apparatus or a translation service supporting apparatus, which is accessible through the first communication unit 110, the translation service support program 151 can include functional processing routines for supporting access to the supporting apparatuses and the translation service.

The voice recognition DB 153 has a configuration to internally support a voice recognition function when the transmitter-side terminal 100 is designed not to use a separately arranged ASR/translation server or to use the ASR/translation server together with the voice recognition DB 153 for the voice recognition. Although the voice recognition DB 153 as described above can provide a voice recognition result with a lower reliability and a slower calculation speed in comparison with the ASR/translation server, the voice recognition DB 153 can support a voice recognition function in a form specified to the user of the transmitter-side terminal 100. That is, data stored in the voice recognition DB 153 can include a voice signal previously input by the user of the transmitter-side terminal 100 stored as a voice recognition history, including information on which text a user voice signal having a particular pattern corresponds to. As a result, the internally stored voice recognition DB 153 can support a voice recognition function specified to the user, differently from the ASR/translation server to which various terminals accesses to request voice recognition. To this end, voice recognition DB 153 can have a learning function under the control of the first controller 160. The learning function can be a function of recording occurrence of an event, in which a voice recognition result of a voice signal input by a user is modified to another voice recognition result due to an input of correction in a process of matching the voice recognition result to the voice signal, so as to reflect the event in a future voice recognition result. Through repetition of the above process, the learning function improves the exactness of the voice recognition result to the voice signal input by the user.

The voice-for-TTS DB 155 is a database including voices for conversion of words, phrases, postpositional particles, or sentences input as letters or a text to a voice signal. The voice-for-TTS DB 155 can be used in order to support a TTS service. Especially, the voice-for-TTS DB 155 can be configured by a database in which a text corresponding to at least one language is matched to a voice signal corresponding to the text, in order to support a TTS translation service. Accordingly, when the transmitter-side terminal 100 receives a translated text from the receiver-side terminal 200 and is configured to output the translated text as a voice, the first controller 160 can output a translated voice based on the information stored in the voice-for-TTS DB 155.

The transmitter-side terminal 100 can further include a camera and an image captured by the camera can be transferred to the first controller 160. The first controller 160 can support storage of the captured image in the first storage unit 150 or transmission of the captured image to the receiver-side terminal 200 according to a control of a user and a currently activated function. Especially, the camera can have a configuration for collecting images required for operation of a video communication with the receiver-side terminal 200. The translation service function of the present invention can be provided during a video communication between the transmitter-side terminal 100 and the receiver-side terminal 200. In this event, a translated text can be provided through subtitles of a screen for the video communication.

Figure 3:
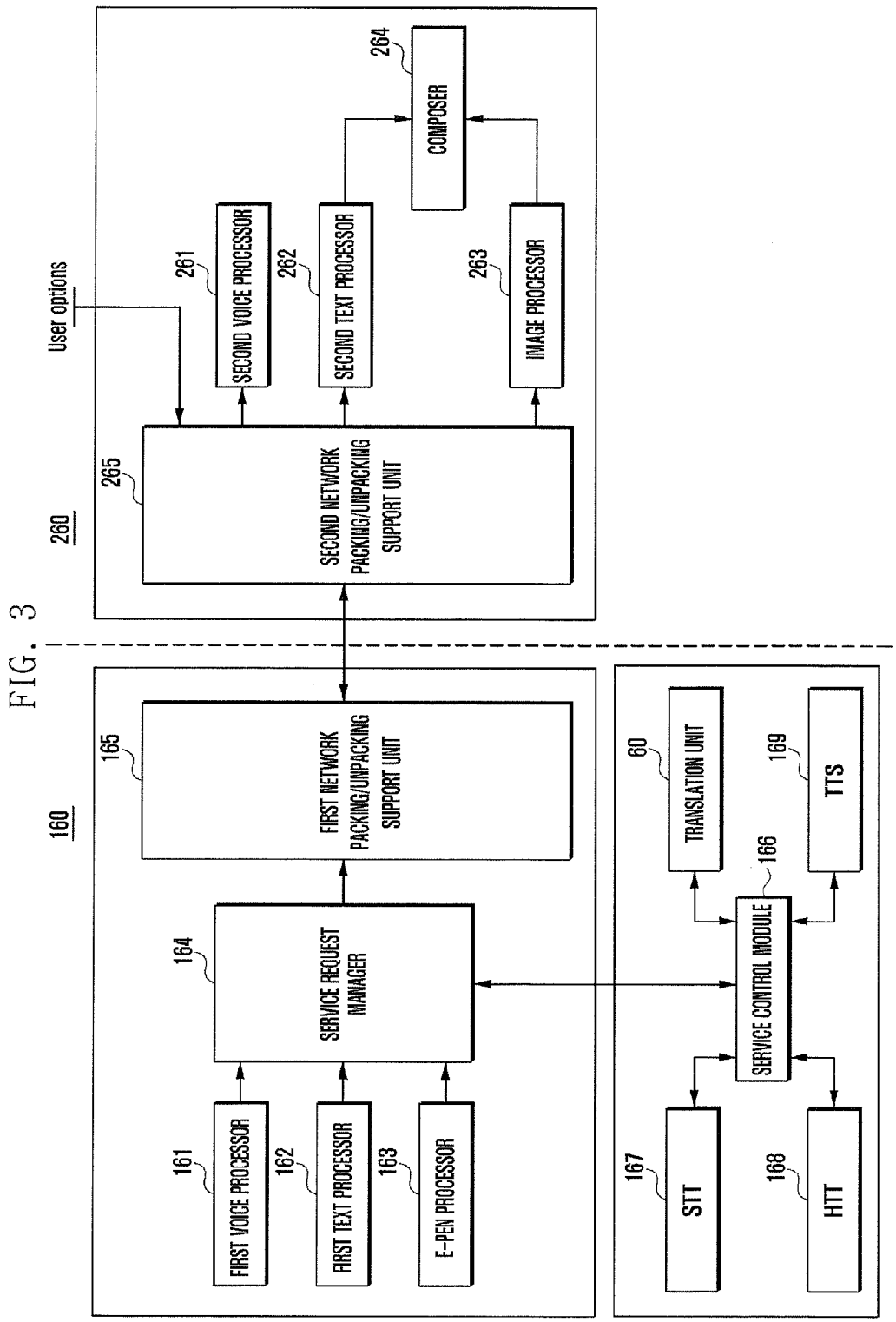
FIG. 3 is a block diagram illustrating the configuration of a first controller of the transmitter-side terminal and a second controller of the receiver-side terminal according to an embodiment of the present invention in more detail.

The first controller 160 has a configuration for various ways of power supply and signal control necessary for operation of the transmitter-side terminal 100 according to an embodiment of the present invention. Especially, the first controller 160 can control data transfer and signal control for supporting a communication service operation of the present invention. To this end, the first controller 160 can have a construction as shown in FIG. 3 and will be described in more detail with reference to FIG. 3.

Meanwhile, the receiver-side terminal 200 according to the present invention can include a second communication unit 210, a second input unit 220, a second microphone 231, a second speaker 233, a second display unit 240, a second storage unit 250, and a second controller 260. The receiver-side terminal 200 having the configuration as described above establishes a communication channel for use of a communication service with the transmitter-side terminal 100 through the second communication unit 210. Especially, the second communication unit 210 can establish various communication channels for operation of a translation service-based communication service, such as a chatting service channel, an SMS channel, a voice communication channel, and a video communication channel.

The second display unit 240 outputs chatting information, SMS information, etc. provided by the transmitter-side terminal 100. Further, the second display unit 240 can output a screen indicating that a voice communication is being performed and can output translation information during a voice communication. The translation information output by the second display unit 240 can be information obtained by translating information obtained through recognition of a voice signal provided by the transmitter-side terminal 100. Further, the second display unit 240 can output the text before the translation provided by the transmitter-side terminal 100, together with the translated text. Further, the second display unit 240 can output a text input by a user of the transmitter-side terminal 200, together with a translation text translated from the input text. Further, the second display unit 240 can output a text obtained by voice-recognition of a voice signal input through the transmitter-side terminal 200, together with a translation text translated from the text obtained by the voice-recognition.

To this end, the second microphone 231 collects a voice signal of the user of the receiver-side terminal 200 and provides the collected voice signal to the second controller 260. The second speaker 233 has a configuration for outputting a voice signal provided by the transmitter-side terminal 100. Especially, the second speaker 233 can output a voice signal corresponding to a translation text provided by the transmitter-side terminal 100 or a translation voice signal provided by the transmitter-side terminal 100 under the control of the second controller 260. To this end, the second storage unit 250 can store voice database for conversion of a translation text to a translation voice signal. Further, when the receiver-side terminal 200 uses a second language and the transmitter-side terminal 100 provides a text made in a first language, the second storage unit 250 of the receiver-side terminal 200 can include a translation support database for translation of the text in the first language into a translation text in the second language. Further, when the transmitter-side terminal 100 provides a voice signal in a first language, the second storage unit 250 can include a voice recognition database for voice-recognition of the voice signal in the first language and a voice database for conversion of a translation text of a second language to a voice signal in the second language. The second storage unit 250 described above can store and manage various databases according to design schemes for supporting a translation-based communication service of the present invention.

The second controller 260 can perform a communication channel establishment control in the second communication unit 210, a control for execution of a translation-based communication service according to a pre-designed scheme in response to reception of a request for a translation-based communication service operation, a negotiation control for supporting a translation-based communication service with the transmitter-side terminal 100, a used language identification control, and a language selection control according to a designation by a user. Further, the second controller 260 can support provision of various types of translation information as described above. That is, the second controller 260 can perform a control to provide at least one text among a chatting service-based translation text, an SMS-based translation text, a voice communication-based translation text, a voice communication-based translation text collected in a video communication, and a translation text provided as subtitles of a video communication, according to a configuration made by a user. The configuration of the second controller 260 described above includes a configuration as shown in FIG. 3.

FIG. 3 is a block diagram illustrating a construction of the first controller 160 of the transmitter-side terminal 100 and a construction of the second controller 260 of the receiver-side terminal 200.

Referring to FIG. 3, the first controller 160 can include a first voice processor 161, a first text processor 162, an E-pen processor 163, a service request manager 164, a first network packing/unpacking support unit 165, a service control module 166, an STT module 167, an HTT module 168, a translation unit 60, and a TTS module 169. The first controller 160 can further include a camera operation unit for providing video communication service-based translation information. The camera operation unit can provide an image collected by a camera to the service request manager, and can transfer a voice signal collected by the first microphone 131 to the service request manager 164 together with the provided image.

The first voice processor 161 processes a voice signal collected by the first microphone 131 to generate voice data. For example, the first voice processor 161 can be an encoder for processing a voice signal. Voice data processed by the first voice processor 161 is provided to the service request manager 164 and can be transferred to at least one of the first network packing/unpacking support unit 165 and the service control module 166 according to a control of the service request manager 164.

The first text processor 162 converts a signal input from the first input unit 120 and the first display unit 140 having an input function to a letter. A letter converted by the first voice processor 162 is provided to the service request manager 164 and can be transferred to at least one on the first network packing/unpacking support unit 165 and the service control module 166 according to a control of the service request manager 164.

The E-pen processor 163 processes information made by an Electronic pen provided as an input means. For example, the E-pen processor 163 collects handwriting information, which is input through operation of an electronic pen and a pen touch panel for operation of the electronic pen, in the form of an image. Further, the E-pen processor 163 can provide collected handwriting information to the service request manager 164. Each of the transmitter-side terminal 100 and the receiver-side terminal 200 can further include an electronic pen and a pen touch panel capable of recognizing the electronic pen to enable input of handwriting information.

The service request manager 164 transfers a signal to the service control module 166 transferred from the first voice processor 161 or the first text processor 162 to generate translation information, and provides the generated translation information to the first network packing/unpacking support unit 165. In this event, the service request manager 164 can transfer a voice signal and a text transferred from the first voice processor 161 and the first text processor 162, together with the translation information, to the first network packing/unpacking support unit 165.

The service control module 166 generates translation information based on the information having been provided by the service request manager 164 and provides the generated translation information to the service request manager 164. Especially, the service control module 166 transfers a voice signal provided by the first voice processor 161 to the STT module 167 to convert the voice signal to text information based on the voice recognition DB 153. Further, the service control module 166 transfers a text provided by the STT module 167 to the translation unit 60 to generate a translation text. When receiving a translation text from the translation unit 60, the service control module 166 can provide the translation text to the service request manager 164. Also, the service control module 166 can provide the translation text to the TTS module 169 to generate a translation voice signal. The generated translation voice signal is provided, together with the translation text, to the service request manager 164. In a similar manner, the service control module 166 can transfer a text provided by the first text processor 162 to the translation unit 60 to generate a translation text, and then provide the translation text to the service request manager 164. Also, the service control module 166 can convert the translation text to a translation voice signal by using the TTS module 169, and then transfer the translation voice signal to the service request manager 164. Further, the service control module 166 can transfer image information provided by the E-pen processor 163 to the HTT module 168 and transfer an image recognition text provided by the HTT module 168 to the translation unit 60 to convert the image recognition text a translation text, and then provide the translation text to the service request manager 164.

The STT module 167 voice-recognizes a voice signal provided by the service control module 166 to generate a text. To this end, the STT module 167 can operate the voice recognition DB 153 to voice-recognize a voice signal. Further, when a voice recognition-based text generation function of the present invention is designed to be performed based on a separate ASR server, the STT module 167 can support an access to the ASR server by using the first communication unit 110 and provision of a voice signal to receive text information corresponding to the provided voice signal.

The HTT module 168 recognizes handwriting information provided by the E-pen processor 163 as a particular text. To this end, the HTT module 168 performs image recognition of a virtual note page including handwriting information and converts particular handwritten letters to text letters provided by a corresponding terminal. The converted text letters can be provided to the service control module 166.

The translation unit 60 generates a translation text corresponding to a text provided by the service control module 166. To this end, the translation unit 60 can manage a database in which a first language text and a second language text are mapped to each other, and can convert a first language text and a second language text to generate a translation text. In this process, the translation unit 60 collects candidate words in the second language corresponding to a particular word in the first language, configures a sentence corresponding to the text to be translated based on the candidate words, and selects most proper words to configure the sentence.

Meanwhile, the translation unit 60 of the present invention can remove non-verbal elements having no meaning. For example, the translation unit 60 can remove repetitive expressions having no meaning, such as "uhm . . . ", "you know . . . ", and "now . . . ", from the collected text to support proper sentence translation.

The TTS module 169 converts a text to a voice signal. Especially, the TTS module 169 of the present invention converts a translation text to a voice signal to generate a translation voice signal. To this end, the TTS module 169 can manage and operate a database which includes text information corresponding to the translation target language, i.e. the language of the receiver-side terminal, and voice information mapped to the text information. The TTS module 169 of the present invention collects voice-related characteristic information including the pitch, tone, and feature of a received voice signal and applies the collected voice-related characteristic information to the translation voice signal. That is, when converting a translation text to a translation voice signal, the TTS module 169 can collect voice-related characteristic information relating to the voice of the user and generate a translation voice signal most similar to the collected voice-related characteristic information. To this end, the TTS module 169 can further include a configuration for adjusting the pitch, tone, and feature of a voice so as to generate translation voice signals having various tones. For example, the TTS module 169 can support generation of a translation voice signal corresponding to the sex of a user. Further, when a user's voice has a high tone or low tone, the TTS module 169 can generate a translation voice signal having the same tone.

The first network packing/unpacking support unit 165 transfers various information provided by the service request manager 164 to the second network packing/unpacking support unit 265 of the receiver-side terminal 200. In this process, the first network packing/unpacking support unit 165 integrally packs the collected voice signal, text, translation text, translation voice signal, and handwriting information, and then provides the integrally packed information to the receiver-side terminal 200. For example, in response to a request for transmission of a voice signal based on a translation service, the first network packing/unpacking support unit 165 can integrate the voice signal, a text obtained by voice-recognizing the voice signal, a translation text obtained by translating the text, and a translation voice signal generated based on the translation text, and then provide the integrated information to the receiver-side terminal 200. In this event, the first network packing/unpacking support unit 165 can not transmit the voice signal and the translation voice signal according to a modified configuration. Moreover, the first network packing/unpacking support unit 165 can receive particular information from the receiver-side terminal 200, unpack the received information, and then provide the unpacked information to the first voice processor 161 and the first text processor 162 through the service request manager 164.

Referring again to FIG. 3, the second controller 260 included in the receiver-side terminal 200 of the present invention includes a second network packing/unpacking support unit 265, a second voice processor 261, a second text processor 262, an image processor 263, and a composer 264.

The second network packing/unpacking support unit 265 unpacks transmission information of the transmitter-side terminal 100 received by the second communication unit 210, and packs information to be provided to the transmitter-side terminal 100 and provides the packed information to the second communication unit 210. Further, the second network packing/unpacking support unit 265 transfers pieces of information, which are provided by the transmitter-side terminal 100 and then unpacked, to the second voice processor 261, the second text processor 262, and the image processor 263. That is, when received information includes voice data or translation voice data, the second network packing/unpacking support unit 265 transfers the data to the second voice processor 261. Further, when received information includes text information or image information, the second network packing/unpacking support unit 265 transfers the text information to the second text processor 262 and the image information to the image processor 263.

When receiving voice data or translation voice data from the second network packing/unpacking support unit 265, the second voice processor 261 performs a voice processing according to a predefined scheme. Further, the second voice processor 261 outputs the processed voice signal through the second speaker 233.

When receiving a text signal from the second network packing/unpacking support unit 265, the second text processor 262 performs a processing in order to output the text signal to the second display unit 240. Then, the second text processor 262 transfers the processed text signal to the composer 264.

The image processor 263 processes image data provided by the second network packing/unpacking support unit 265 and then provides the processed image data to the composer 264. For example, the image processor 263 can image-process an image frame received during a video communication and then transfer the processed image frame to the composer 264. Further, the image processor 263 processes handwriting image data made by the E-pen function and then provides the processed handwriting image data to the composer 264.

The composer 264 combines the text provided by the 262 and the image information provided by the image processor 263. Then, the composer 264 outputs a combined image information through the second display unit 240. In this event, when the received information does not include image information, the composer 264 can output only the text. Especially, the composer 264 can combine a translation text with a predetermined background image to output a combined image through the second display unit 240.

Figure 4:
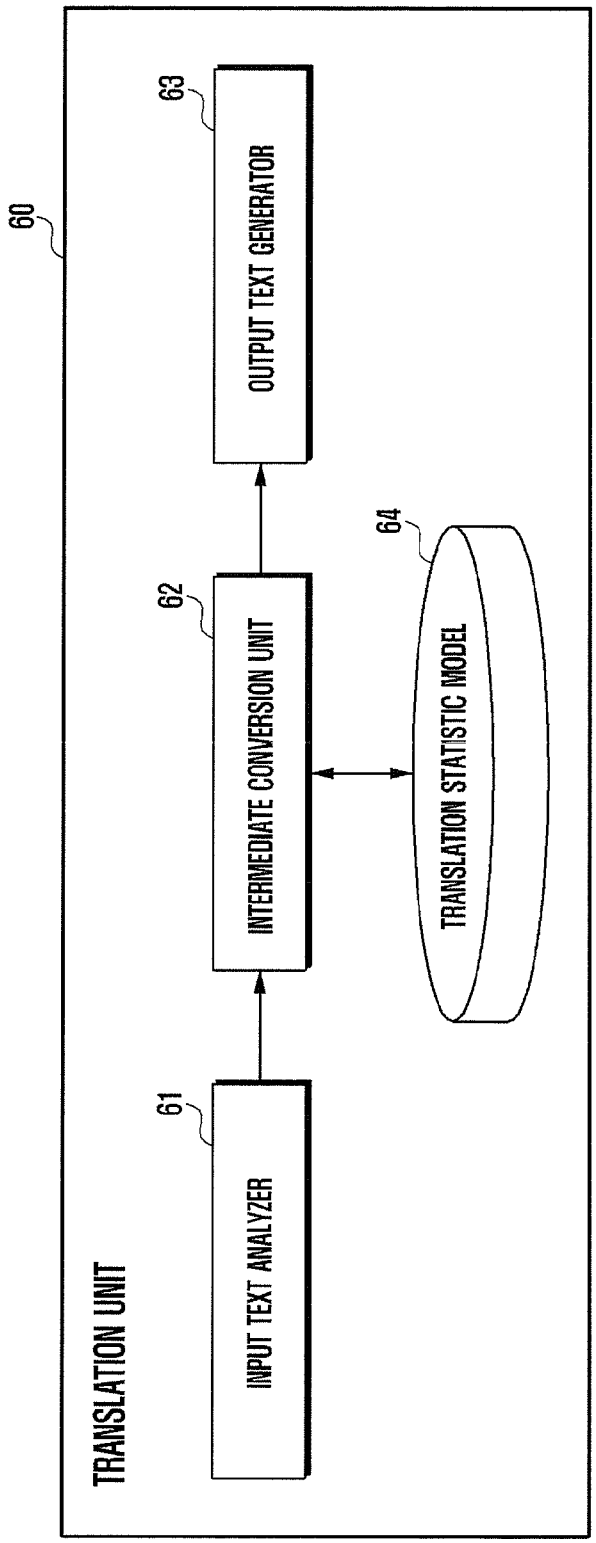
FIG. 4 is a block diagram illustrating the configuration of a translation unit an embodiment of the present invention in more detail.

FIG. 4 is a block diagram illustrating a configuration of the translation unit in more detail in the configuration of the terminal supporting a translation-based communication service according to an embodiment of the present invention.

Referring to FIG. 4, the translation unit 60 of the present invention includes an input text analyzer 61, an intermediate conversion unit 62, an output text generator 63, and a translation statistic model DB 64.

The input text analyzer 61 analyzes a text obtained through an analysis of an input handwriting image or a text input through at least one of the first display unit 140 having an input function and the first input unit 120. Especially, the input text analyzer 61 identifies each sentence in a text, each word/phrase included in each sentence, and a word and a postpositional particle included in each phrase. Further, the input text analyzer 61 can transfer a result of the analysis, sentence by sentence, to the intermediate conversion unit 62.

The intermediate conversion unit 62 selects a translation text corresponding to a phrase, a word, a postpositional particle, etc. included in the sentence-unit texts provided by the input text analyzer 61. To this end, the intermediate conversion unit 62 compares the transferred texts with various translation models stored in the translation statistic model DB 64 to select a translation model showing the highest coincidence. The translation information selected based on the translation statistic model DB 64 by the intermediate conversion unit 62 is provided to the output text generator 63.

The output text generator 63 configures a sentence by combining the translation phrases, words, postpositional particles provided by the intermediate conversion unit 62. Further, the output text generator 63 can output and provide the configured sentence to the service control module 166.

The translation statistic model DB 64 includes translation models corresponding to particular phrases, words, postpositional particles. The translation statistic model DB 64 functions as a database of translation information.

Figure 5:
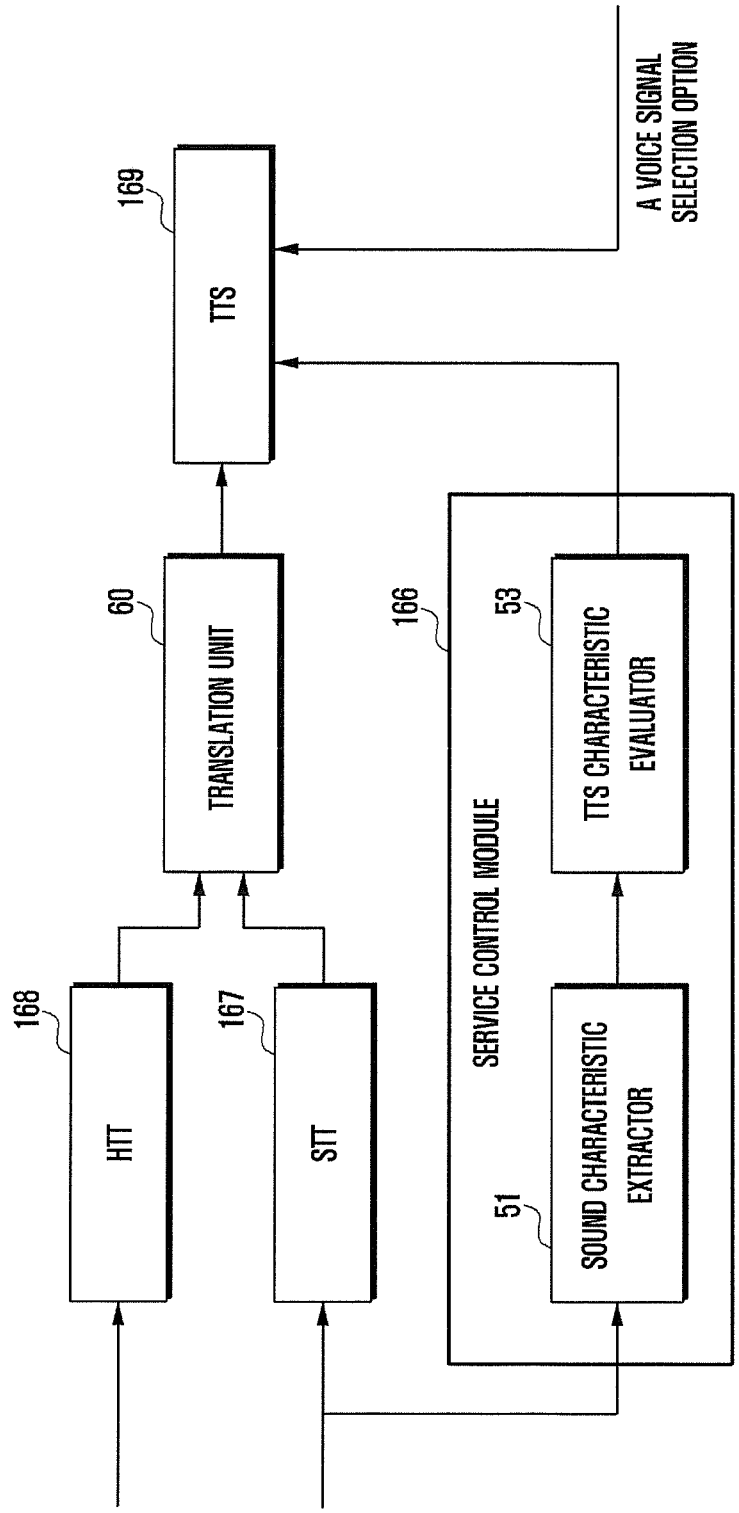
FIG. 5 is a block diagram illustrating an example of the structure of the first controller according to an embodiment of the present invention.

FIG. 5 is a block diagram illustrating a part of the construction of the first controller 160 for describing a translation voice signal support function among the translation-based communication service functions according to the first embodiment of the present invention.

Referring to FIG. 5, the service control module 166 in the first controller 160 of the present invention includes a sound characteristic extractor 51 and a TTS characteristic evaluator 53.

When the service request manager 164 provides a voice signal, the sound characteristic extractor 51 extracts sound characteristics from the voice signal. For example, the sound characteristic extractor 51 extracts characteristics relating to a voice signal, such as voice tone characteristic, pitch, timbre, and vocalization speed. The sound characteristic extractor 51 provides the extracted information to the TIS characteristic evaluator 53.

The TTS characteristic evaluator 53 evaluates the voice signal-related characteristics provided by the sound characteristic extractor 51 and provides a result of the evaluation to the TTS module 169. Especially, the TIS characteristic evaluator 53 can determine which TTS parameter the characteristics provided by the sound characteristic extractor 51 correspond to, and then provide the determined TTS parameter to the TTS module 169. That is, the TTS characteristic evaluator 53 determines whether the voice tone corresponds to a man or a woman and which level the pitch corresponds to, based on predefined parameter values.

The service control module 166 transfers the voice signal provided by the service request manager 164 to the STT module 167 while providing the voice signal to the sound characteristic extractor 51 and the TTS characteristic evaluator 53 to obtain voice characteristics. Meanwhile, the text information generated by the HTT module 168 and the module 167 is provided to the translation unit 60, which can translate the text into a particular language. Further, the translation unit 60 can provide the translation text to the STT module 169 under the control of the service control module 166. Then, the TTS characteristic evaluator 53 included in the service control module 166 provides a TTS parameter value to the TTS module 169.

Therefore, the TTS module 169 can convert a translation text provided by the translation unit 60 to a translation voice signal while applying a TTS parameter provided by the TTS characteristic evaluator 53, so as to generate a translation voice signal similar to an actual voice signal of the user. In addition, the transmitter-side terminal 100 receives an input signal indicating a voice signal selection option and provides the received option to the TTS module 169. The user can adjust, by himself or herself, the characteristics of the translation voice signal generated through the TTS module 169 by selecting a corresponding menu or icon or generating an input event indicating change of the configuration. Especially, the user can generate an input event for adjustment of a parameter value provided to the TTS module 169 and the transmitter-side terminal 100 can adjust the voice signal in response to the adjustment of the parameter value.

Figure 6:
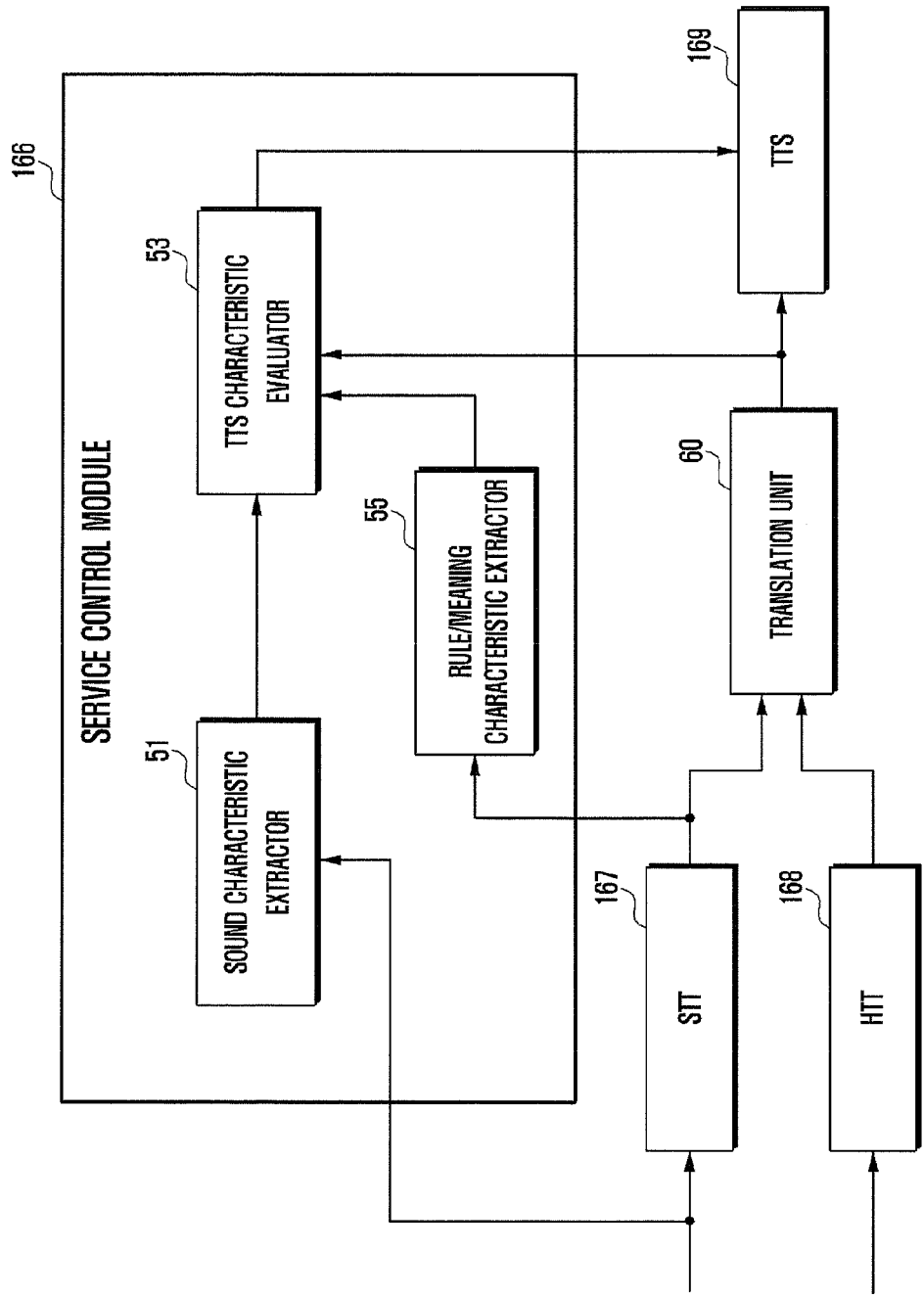
FIG. 6 is a block diagram illustrating another example of the structure of the first controller according to an embodiment of the present invention.

FIG. 6 is a block diagram illustrating a part of the construction of the first controller 160 for describing a translation voice signal support function among the translation-based communication service functions according to the second embodiment of the present invention.

Referring to FIG. 6, the service control module 166 of the first controller 160 of the present invention includes a sound characteristic extractor 51, a TTS characteristic evaluator 53, and a rule/meaning characteristic extractor 55. The sound characteristic extractor 51 receives a voice signal, which is provided to the STT module 167 also, from an element before the STT module 167, extracts sound characteristics from the voice signal, and then provides the extracted sound characteristics to the TTS characteristic evaluator 53.

The rule/meaning characteristic extractor 55 is connected to the posterior terminal of the STT module 167 and extracts characteristics of the text information output from the STT module 167. Especially, the rule/meaning characteristic extractor 55 obtains characteristics, such as rules and meaning, of the text output from the STT module 167, and provides the obtained information to the TTS characteristic evaluator 53. For example, the rule/meaning characteristic extractor 55 extracts rules and meaning of a voice signal collected based on state information which defines a speaker's feeling based on the pitch, frequency, and vocalization speed of a voice signal. For example, the rule/meaning characteristic extractor 55 can determine a state with a relatively high pitch and rapid vocalization speed as a state in which a speaker is upset or a state in which a speaker is angry. Further, the rule/meaning characteristic extractor 55 can determine a state with a relatively low pitch and slow vocalization speed as a state in which a speaker is stable or a state in which a speaker feels comfortable. Further, the rule/meaning characteristic extractor 55 can determine a state with a rapidly fluctuating pitch and an irregular vocalization speed as a state in which a speaker is depressed or a state in which a speaker is sobbing. The state information provides data which enables estimation of a speaker's feeling based on various elements including pitch, frequency, tone, and vocalization speed. The state information can be either defined by a speaker by writing his or her feeling states by himself or herself, or provided from an external server through reception of predefined state information. The rule/meaning characteristic extractor 55 provides the extracted characteristics to the TTS module 169.

Meanwhile, the sound characteristic extractor 51 receives a voice signal in a state before being provided to the STT module 167, extracts sound characteristics from the voice signal, and then provides the extracted sound characteristics to the TTS characteristic evaluator 53. The TTS characteristic evaluator 53 receives characteristics including rules and meaning of the text, which has been output from the STT module 167, from the rule/meaning characteristic extractor 55. Further, the TTS characteristic evaluator 53 receives a translation text output from the translation unit 60. The TTS characteristic evaluator 53 reflects the sound characteristics including the rules and meaning characteristics of the voice signal in predetermined parts of the translation text, such as vocabulary or word, and provides the reflected translation text to the TTS module 169.

The TTS module 169 converts the translation text transferred from the translation unit 60 into a voice in the language of the receiver-side terminal 200 while reflecting the voice signal characteristics provided by the TTS characteristic evaluator 53 in the voice conversion. Therefore, various voice-related characteristics, such as voice characteristics of a speaker and a speaker's feeling, can be reflected in a translation voice of a voice signal in a translation-based communication service of the present invention. As a result, a voice signal generated in a particular form by a speaker with a particular feeling is translated into a voice in a similar form with similar tone and vocalization speed, etc. indicating a similar feeling, and the translated voice is output through the receiver-side terminal 200.

Meanwhile, the application of the translation voice of the voice-related information through extraction of rules/meaning, TTS evaluation, and the extraction of the voice characteristics as described above can be performed by the second controller 260 of the receiver-side terminal 200. Otherwise, the application of the voice-related characteristics to a translation voice as described above can be designed to be provided by a server separately arranged in a system designed to use a translation-based communication service of the present invention.

Figure 7:
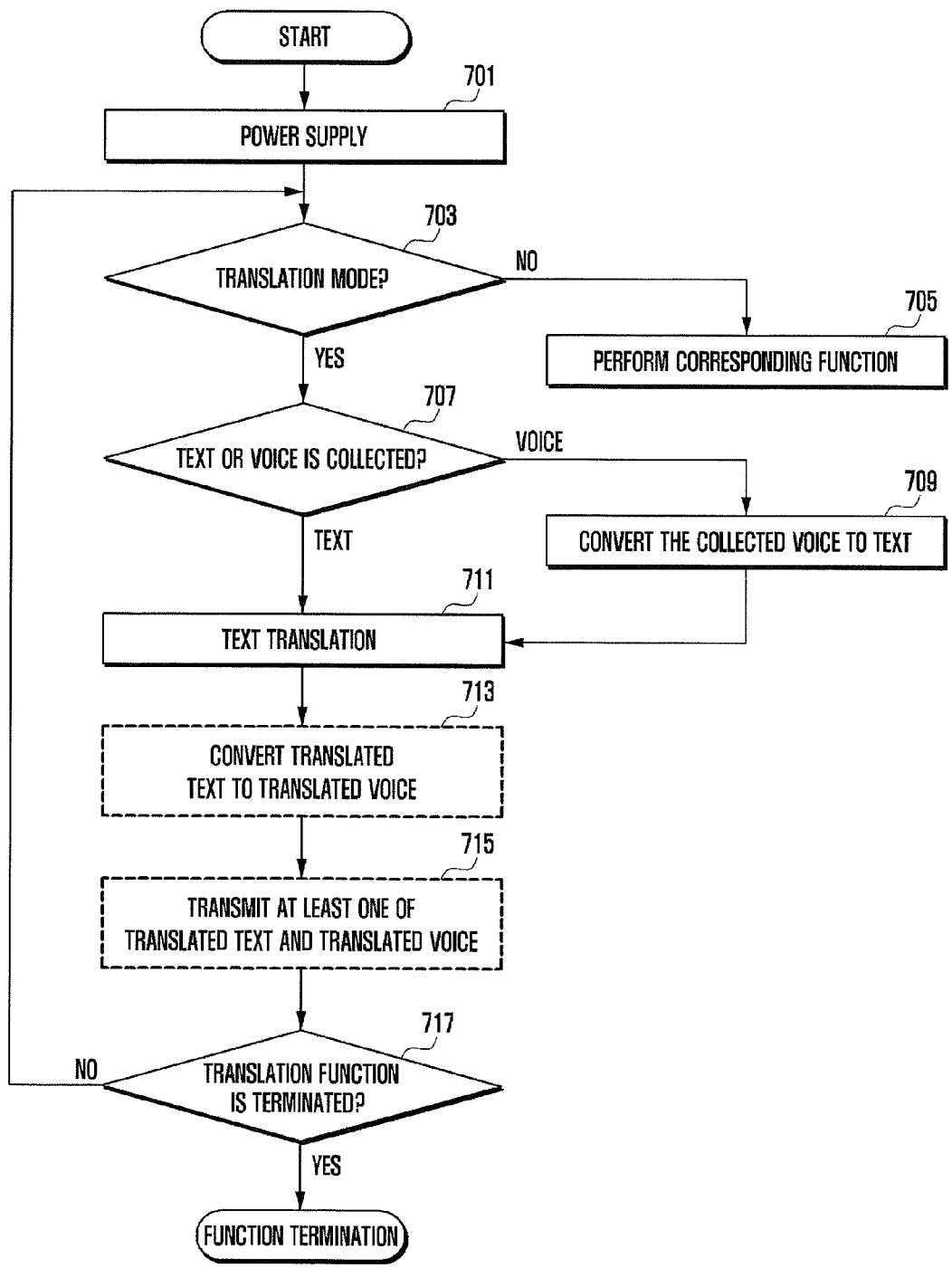
FIG. 7 is a flowchart for describing an operation of a transmitter-side terminal in a translation-based communication service operation system according to an embodiment of the present invention.

FIG. 7 is a flowchart for describing an operation method of a transmitter-side terminal in a translation-based communication service operation system according to an embodiment of the present invention.

Referring to FIG. 7, in the operation method of the transmitter-side terminal 100 for supporting a translation-based communication service of the present invention, at first, the first controller 160 allows supply of the electric power provided by a battery, etc. to each element of the transmitter-side terminal 100 in step 701. Then, in step 703, the first controller 160 determines whether the translation mode is in an activated state. Specifically, according to a schedule configuration, the first controller 160 can determine whether the translation mode has been already activated or whether an input event for activation of the translation mode has occurred. Then, as a result of the determination in step 703, when the translation mode has not been activated or when a received input event is not an event for activation of the translation mode, the first controller 160 performs a function according to the input event or a function according to a schedule recorded in the schedule information in step 705. For example, the first controller 160 supports operation of various functions, including a chatting service function, a voice communication service function, a video communication service function, a file reproduction function, and a file edition function, according to the operation of the transmitter-side terminal 100 in step 705.

Meanwhile, as a result of the determination in step 703, when the translation mode has been activated, the first controller 160 determines whether a text or voice is collected, in step 707. As a result of the determination in step 707, when a voice input occurs, the first controller 160 supports conversion of an input voice signal to a text in step 709. For the conversion into the text, the first controller 160 can use the voice recognition DB 153 stored in the first storage unit 150 or support a conversion into the text by an ASR server connected through a network.

Meanwhile, as a result of the determination in step 707, when a text is input, the first controller 160 supports translation of the text in step 711. In this event, the first controller 160 can support conversion of a voice signal into a text in step 709, before the translation of the text. For the translation of the text, the first controller 160 can support the translation of the text using a database arranged to enable a translation from the first language of the transmitter-side terminal 100 to the second language of the receiver-side terminal 200.

Next, the first controller 160 controls the translation text to be converted to a translation voice corresponding to the translation text in step 713. To this end, the transmitter-side terminal 100 can support use of a database by which a translation text can be converted to a translation voice, that is, the voice-for-TTS DB 155 by which the text in the second language configured in the receiver-side terminal 200 can be converted to a voice in the second language. Thereafter, in step 715, the first controller 160 can provide at least one of the translation text and the translation voice to the receiver-side terminal 200. Meanwhile step 713 described above can be omitted according to user configuration or according to whether the terminal support the step. When step 713 is omitted, the first controller 160 can provide only the translation text to the receiver-side terminal 200 in step 715.

Next, the first controller 160 determines whether to terminate the translation function, and terminates the translation function in response to occurrence of an input event for termination of the translation function or a request for termination of the translation function. Meanwhile, when an input event or a request for termination of the translation function does not occur, the first controller 160 can return to and repeat the process from step 703.

The translation-based communication service of the transmitter-side terminal 100 described above can be applied to at least one function among various communication service functions, including a chatting service function, an SMS function, a voice communication service function, and a video communication service function, as described above. Especially, the translation-based communication service function of the present invention can support provision of a translation text accompanied by a translation voice in the case of the chatting service function and provision of a translation voice accompanied by a translation text in the case of the voice communication function.

Figure 8:
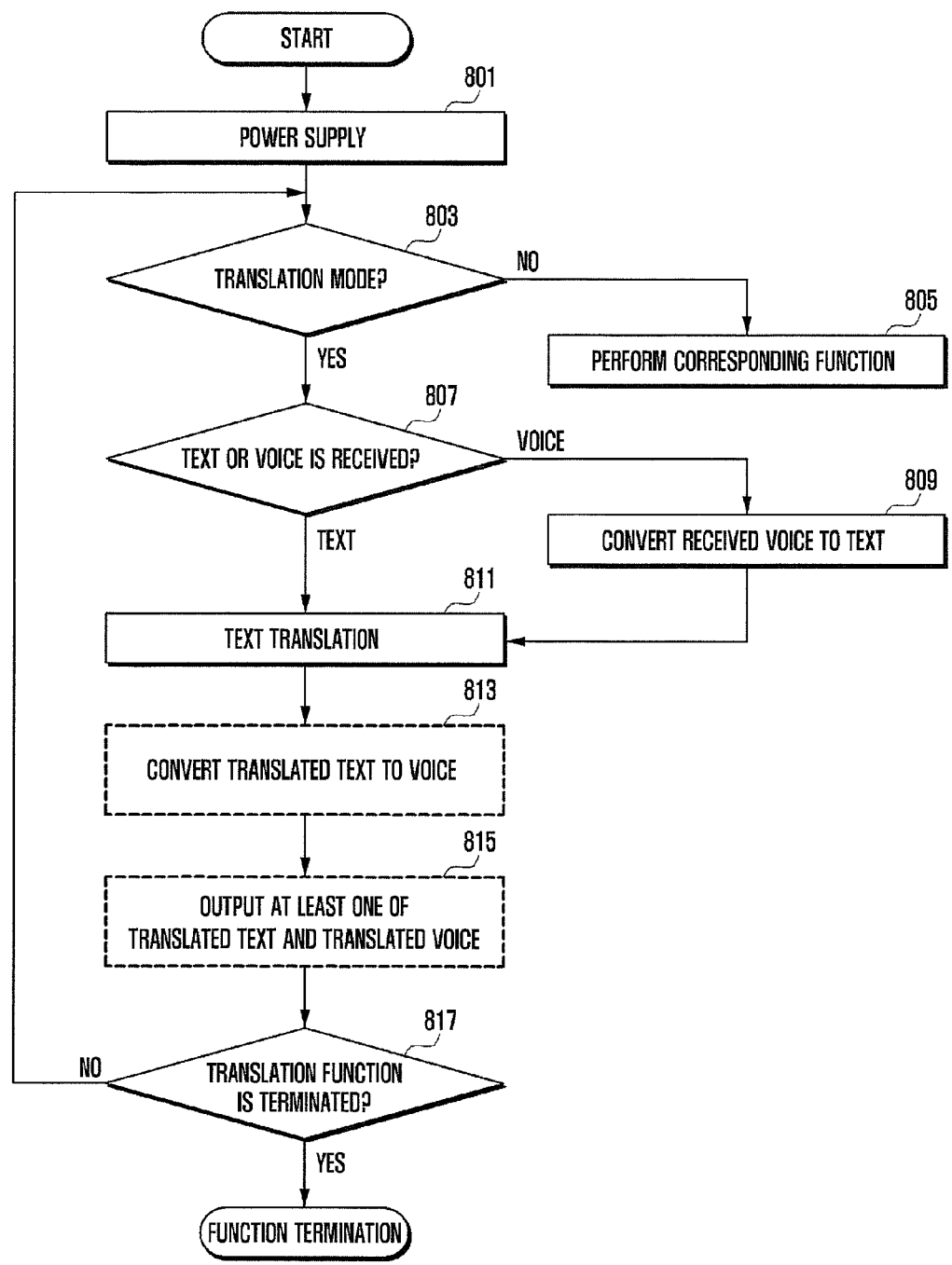
FIG. 8 is a flowchart for describing an operation of a receiver-side terminal in a translation-based communication service operation system according to an embodiment of the present invention.

FIG. 8 is a flowchart for describing an operation of a receiver-side terminal in a translation-based communication service operation system according to an embodiment of the present invention. As a premise of the following description, the operation of the receiver-side terminal 200 is based on a situation in which the transmitter-side terminal 100 does not operate a translation mode and transmits at least one of a text and a voice signal made in a first language configured in the transmitter-side terminal 100.

Referring to FIG. 8, in the operation method of the receiver-side terminal 200 of the present invention, when an electric power is supplied from an electric power source, such as a battery, the second controller 260 supplies the electric power to each element of the receiver-side terminal 200 in step 801. Then, in step 803, the second controller 260 determines whether the translation mode has been configured or whether there is an input event for configuration of the translation mode.

As a result of the determination in step 803, when the translation mode is not configured, the second controller 260 supports an operation of the receiver-side terminal 200 in a state without providing the translation service in step 805. For example, the second controller 260 can support execution of a chatting service function, an SMS function, a voice communication function, and a video communication function in a state in which the translation service is not operated. Otherwise, the second controller 260 can support provision of a file reproduction function, a file edition function, a camera function, a memo and note writing function, etc. according to input events.

Meanwhile, as a result of the determination in step 803, when the translation mode has been configured, the second controller 260 determines whether a text or voice is received from the transmitter-side terminal 100, in step 807. As a result of the determination in this step, when a voice signal is received from the transmitter-side terminal 100, the second controller 260 converts the voice signal to a text in step 809. To this end, the second controller 260 can store a voice recognition database for supporting conversion of a voice signal of a first language provided by the transmitter-side terminal 100 to a text in the first language.

Meanwhile, when the determination step 807 shows that a text is received or when a conversion to a text is performed in step 809, the second controller 260 can control the text to be translated to a text in the second language configured in the receiver-side terminal 200. To this end, the receiver-side terminal 200 can support storage and operation of a database for conversion of a text in the first language to a text in the second language.

Next, the second controller 260 supports conversion of the translation text to a voice signal in step 813. That is, the second controller 260 supports conversion of a translation text made in the second language to a voice signal in the second language. To this end, the second controller 260 supports storage and operation of a database usable for the conversion of a translation text made in the second language to a voice signal in the second language.

The second controller 260 outputs at least one of the translation text and the translation voice signal in step 815. In this step, the second controller 260 outputs at least one of the translation text and the translation voice signal according to whether the receiver-side terminal 200 supports the translation function or according to the configuration by the user. When the translation function is not supported or there is no configuration for the translation mode by the user, the second controller 260 can support outputting of only the translation text or translation voice. Further, when the receiver-side terminal 200 has been configured to output only the translation text, the second controller 260 can omit steps 809 and 813 and can support outputting of only the translation text in step 815.

Next, the second controller 260 determines whether an input event for termination of the translation-based communication service function occurs, in step 817. When an input event for termination of the translation-based communication service function does not occur, the second controller 260 can return to and repeat the process from step 803.

Figure 9:
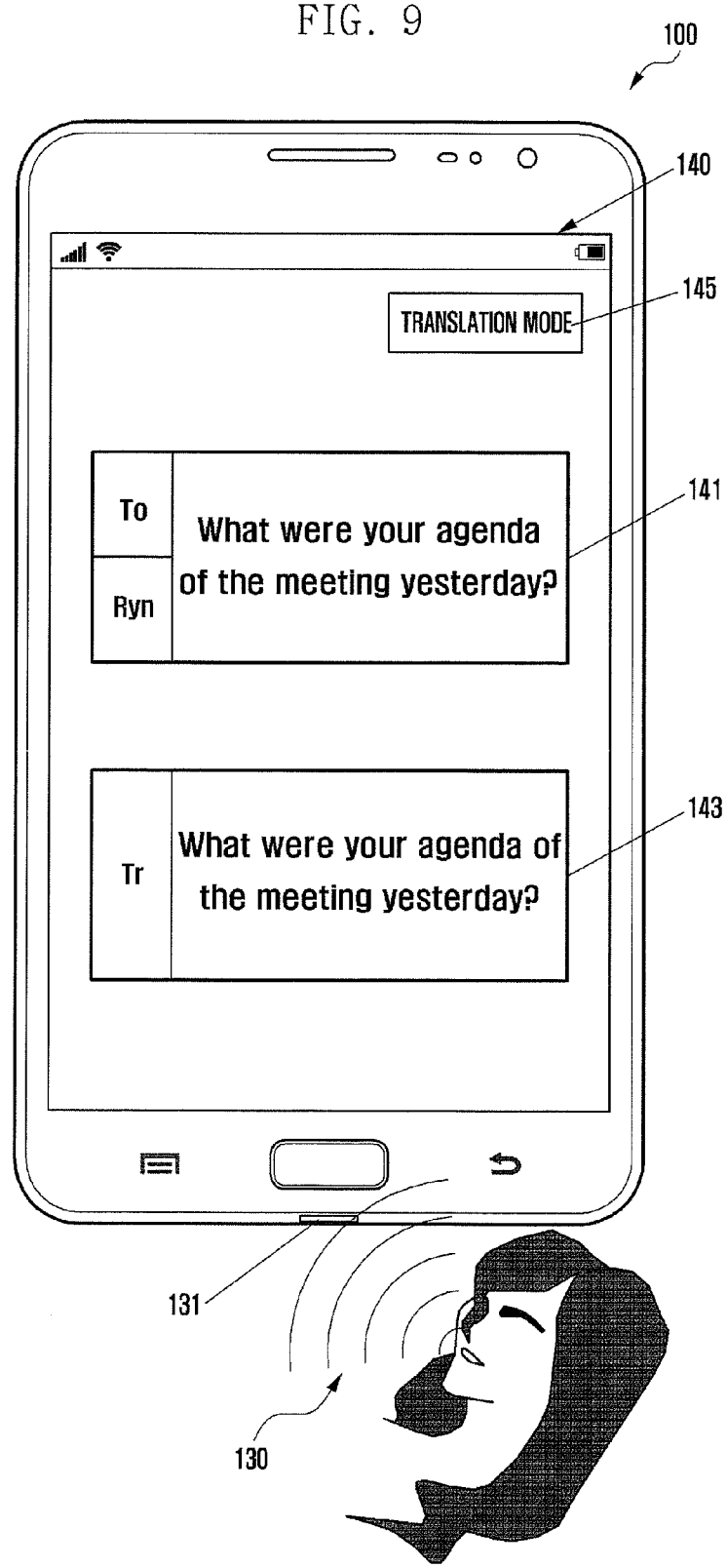
FIG. 9 is a diagram showing an example of a screen interface of a transmitter-side terminal supporting a translation-based communication service according to an embodiment of the present invention.
Figure 10:
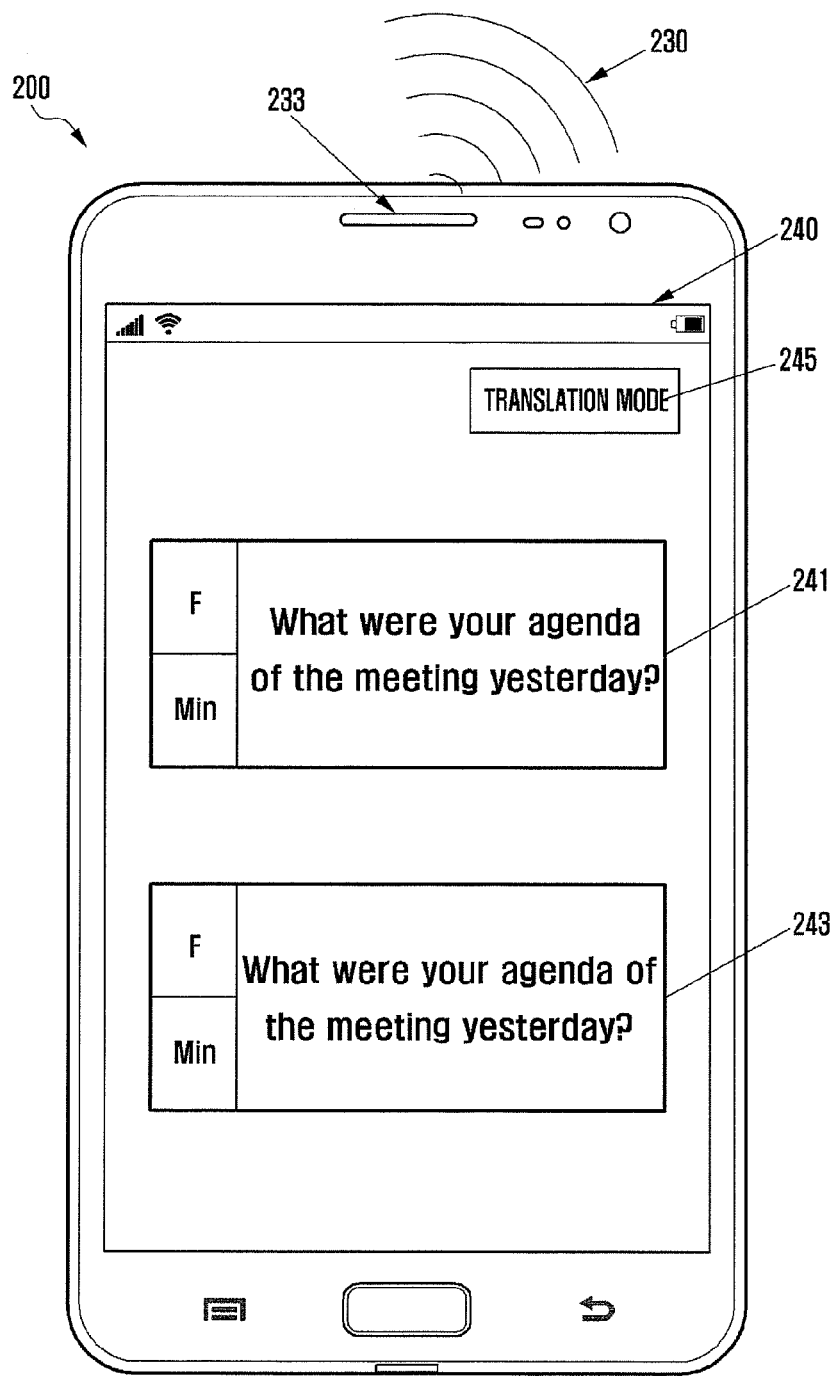
FIG. 10 is a diagram showing an example of a screen interface of a receiver-side terminal supporting a translation-based communication service according to an embodiment of the present invention.

FIG. 9 illustrates an example of a screen interface which can be provided in the transmitter-side terminal in a translation-based communication service function operation according to an embodiment of the present invention, and FIG. 10 illustrates an example of a screen interface which can be provided in the receiver-side terminal. Actually, a terminal performs both a transmitter function and a receiver function while using a communication service. Therefore, the screen interfaces described below can be either individually provided in a terminal, or simultaneously configured and provided in one screen. That is, a predetermined terminal can arrange an area for display of a transmitted message and an area for display of a received message in one screen and can integrally provide the interfaces shown in FIGS. 9 and 10 in one screen. Also, when only the transmitter-side terminal 100 employs the translation mode while the receiver-side terminal 200 does not employ the translation mode, the screen interfaces shown in FIG. 9 can be output in only the transmitter-side terminal and may not be output in the receiver-side terminal. In contrast, when only the receiver-side terminal 200 employs the translation mode while the transmitter-side terminal 100 does not employ the translation mode, the screen interfaces shown in FIG. 10 can be output in only the receiver-side terminal and may not be output in the transmitter-side terminal.

First, referring to FIG. 9, the first display unit 140 of the transmitter-side terminal 100 can display a first translation mode area 145, a transmission message area 141, and a translated transmission message area 143. The first translation mode area 145 is an area in which an item provided to enable configuration to use the translation-based communication service is disposed. The first translation mode area 145 can be provided in the form of an icon or a menu. When the translation mode is being operated, the first translation mode area 145 can provide an indication, such as highlighting, for discrimination from a translation mode non-supporting state. In addition, the first display unit 140 can output a writing window for message writing and then remove the writing window when the message writing is completed.

Further, the transmitter-side terminal 100 can support collection of a voice signal of a speaker through the first microphone 131 and then display of a transmission message converted from the collected voice signal in the transmission message area 141 and the translated transmission message area 143. In this process, the first controller 160 can support voice-recognition of the collected voice signal to generate a transmission message in a first language configured in the transmitter-side terminal 100 and then output the transmission message to the 141. Further, the first controller 160 can support an operation of the translation service support program 151 to convert the transmission message to a translation message and then output the translation message in the translated transmission message area 143. Although both the transmission message area 141 and the translated transmission message area 143 are output in the first display unit 140 of FIG. 9, only one message area, e.g. only the translated transmission message area 143, can be output in the first display unit 140. Further, although a transmission/reception history is not output in FIG. 9, the first controller 160 can support output of a transmission/reception history including transmitted or received messages according to the size of the first display unit 140.

Next, referring to FIG. 10, the second display unit 240 of the receiver-side terminal 200 can include a second translation mode area 245, a reception message area 241, and a translated reception message area 243. The second translation mode area 245 indicates the configuration of the translation mode of the receiver-side terminal 200. When the translation mode is not set in the receiver-side terminal 200, the second translation mode area 245 can be shaded to indicate a deactivated state.

The reception message area 241 is an area for outputting a transmission message received from the transmitter-side terminal 100. Therefore, a message written in the first language configured in the transmitter-side terminal 100 can be output in the reception message area 241. According to the configuration, the reception message area 241 can be removed from the second display unit 240.

The translated reception message area 243 is an area for outputting a translated transmission message received from the transmitter-side terminal 100. The translated transmission message can be a message written in the second language configured in the receiver-side terminal 200. When the transmitter-side terminal 100 does not perform or support the translation mode and when the receiver-side terminal 200 has activated the translation mode, the translated reception message area 243 can serve as an area for outputting a message obtained by translating the transmission message provided by the transmitter-side terminal 100 by the receiver-side terminal.

Meanwhile, even when the translation mode of the receiver-side terminal 200 is in a deactivated state, the transmitter-side terminal 100 can execute a translation mode and provide the transmission message and the translated transmission message. In this event, the second display unit 240 can output the original message before the translation and the translated message in the reception message area 241 and the translated reception message area 243, respectively, as shown. In addition, the second display unit 240 can also output a transmission/reception history including transmitted or received messages according to the state of the terminal or the configuration by the user.

Further, when the transmitter-side terminal 100 provides a translated transmission voice corresponding to the translated transmission message, the receiver-side terminal 200 can support outputting of the translated voice 230 through the second speaker 233. Otherwise, the receiver-side terminal 200 can support conversion of a received translation message into a voice to generate a translated voice and then output the translated voice 230 through the second speaker 233 according to a configuration by a user or a support of the terminal.

The above description has discussed the configurations and operations of the terminals for supporting a translation-based communication service according to embodiments of the present invention. Hereinafter, various examples using a separate external server through a network for a translation-based communication service of the present invention will be described.

Figure 11:
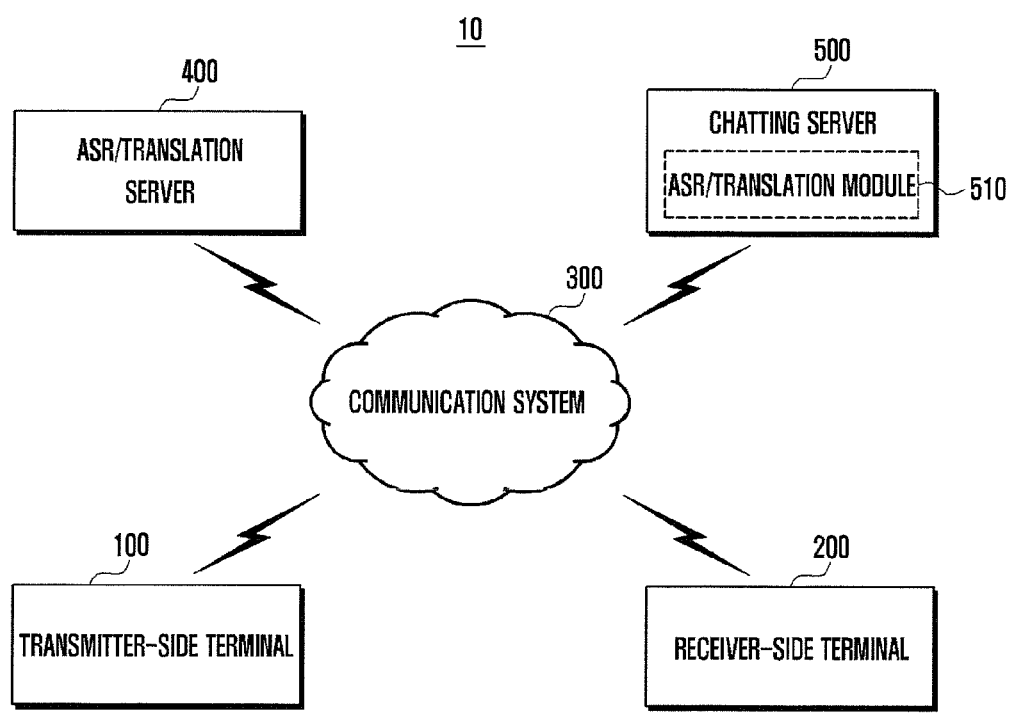
FIG. 11 is a diagram schematically illustrating a construction of a system for supporting a translation-based communication service according to first to fourth embodiments of the present invention.

FIG. 11 is a diagram schematically illustrating a construction of a system for supporting a translation-based communication service according to first to fourth embodiments of the present invention.

Referring to FIG. 11, a translation-based communication service support system 10 of the present invention includes elements of an ASR/translation server 400, a chatting server 500, a transmitter-side terminal 100, a receiver-side terminal 200. Further, the system 10 includes a communication system 300 for signal transfer between the elements.

The ASR/translation server 400 receives a voice signal from the transmitter-side terminal 100 and voice-recognizes the received voice signal to configure a text from the voice signal. To this end, the ASR/translation server 400 can include a voice recognition database for voice recognition and a translation database for translation from a text of a first language to a text of another language. Further, the ASR/translation server 400 collects information on another language appointed by the transmitter-side terminal 100 or a language configured in the receiver-side terminal 200 that will receive a corresponding text, and converts a text of a first language to a text of another language corresponding to the collected information based on the collected information. The ASR/translation server 400 can provide the converted text to a corresponding element, at least one of the transmitter-side terminal 100, the chatting server 500, and the receiver-side terminal 200, according to each embodiment of the present invention. In addition, the ASR/translation server 400 can support voice-translation of the language configured in the receiver-side terminal 200 based on the translation text. To this end, the ASR/translation server 400 can include a database for voice-translation of the translation text.

The chatting server 500 supports transmission or reception of a chatting message including at least one of a voice and a text between the transmitter-side terminal 100 and the receiver-side terminal 200. To this end, the chatting server 500 can provide and install a chatting program to be operated in the transmitter-side terminal 100 and the receiver-side terminal 200 to and in the terminals. Thereafter, the chatting server 500 can support transferring of a particular message provided by the transmitter-side terminal 100 to the receiver-side terminal 200 appointed by the transmitter-side terminal 100. The chatting server 500 can convert a text of a first language provided by the transmitter-side terminal 100 to a text in the second language configured in the receiver-side terminal 200 and then provide the converted text to the receiver-side terminal 200 according to a certain embodiment. To this end, the chatting server 500 can further include an ASR/translation module 510. The ASR/translation module 510 can be configured to support a function of converting a translation text to a translation voice and then providing the converted translation voice.

The transmitter-side terminal 100 accesses the chatting server 500 through the communication system 300 and transmits a chatting message to the receiver-side terminal 200 based on the support of the chatting server 500. In this process, the transmitter-side terminal 100 uses at least one of the ASR/translation server 400 and the ASR/translation module 510 of the chatting server 500 to convert the transmission message to a translated transmission message and request transmission of the translated transmission message to the receiver-side terminal 200. The transmitter-side terminal 100 can collect a voice signal according to a user configuration and request transmission of the collected voice signal to the receiver-side terminal 200. In this process, the transmitter-side terminal 100 can request provision of a translation voice translated from the voice signal to the receiver-side terminal 200.

The receiver-side terminal 200 accesses the chatting server 500 through the communication system 300, and receives and outputs a message, transmission of which is requested by the transmitter-side terminal 100, for example, at least one of a transmission message and a translation transmission message. In this event, when the transmitter-side terminal 100 has requested provision of a translation voice or a user of the receiver-side terminal 200 has requested outputting of a translation voice, the receiver-side terminal 200 can support outputting of not only a translation text but also a translation voice corresponding to the translation text. Otherwise, according to the situation, the receiver-side terminal 200 can support only outputting of a translation voice without providing a translation text.

The communication system 300 supports transmission or reception of data between the elements described above. The communication system 300 as described above has various communication interfaces for data transmission or reception between the elements described above and can support data transmission/reception compatibility between the communication interfaces. For example, the communication system 300 can include a communication interface for communication with a mobile communication system in order to support the mobility of the transmitter-side terminal 100 and the receiver-side terminal 200. Further, the communication system 300 can be connected with the ASR/translation server 400 and the chatting server 500 through an Internet network-based communication interface for data transmission/reception with the ASR/translation server 400 and the chatting server 500. The communication system 300 is not limited to the communication interfaces described above and can include at least one communication interface capable of supporting various communication schemes for signal transfer between the elements.

The communication system 300 can transfer at least one of a text and a voice signal made in a language, e.g. a first language, configured in the transmitter-side terminal 100 to at least one of the ASR/translation server 400 and the chatting server 500. Further, the communication system 300 can transfer at least one of a translation text and a translation voice provided by the ASR/translation server 400 to the transmitter-side terminal 100 and the chatting server 500. Further, the communication system 300 can transfer at least one of a translation text and a translation voice provided by the transmitter-side terminal 100 to the chatting server 500. Further, the communication system 300 can provide at least one of the translation text and the translation voice to the receiver-side terminal 200.

Hereinafter, various embodiments of the translation-based communication service support system 10 will be described in more detail with reference to FIGS. 12 to 15.

Figure 12:
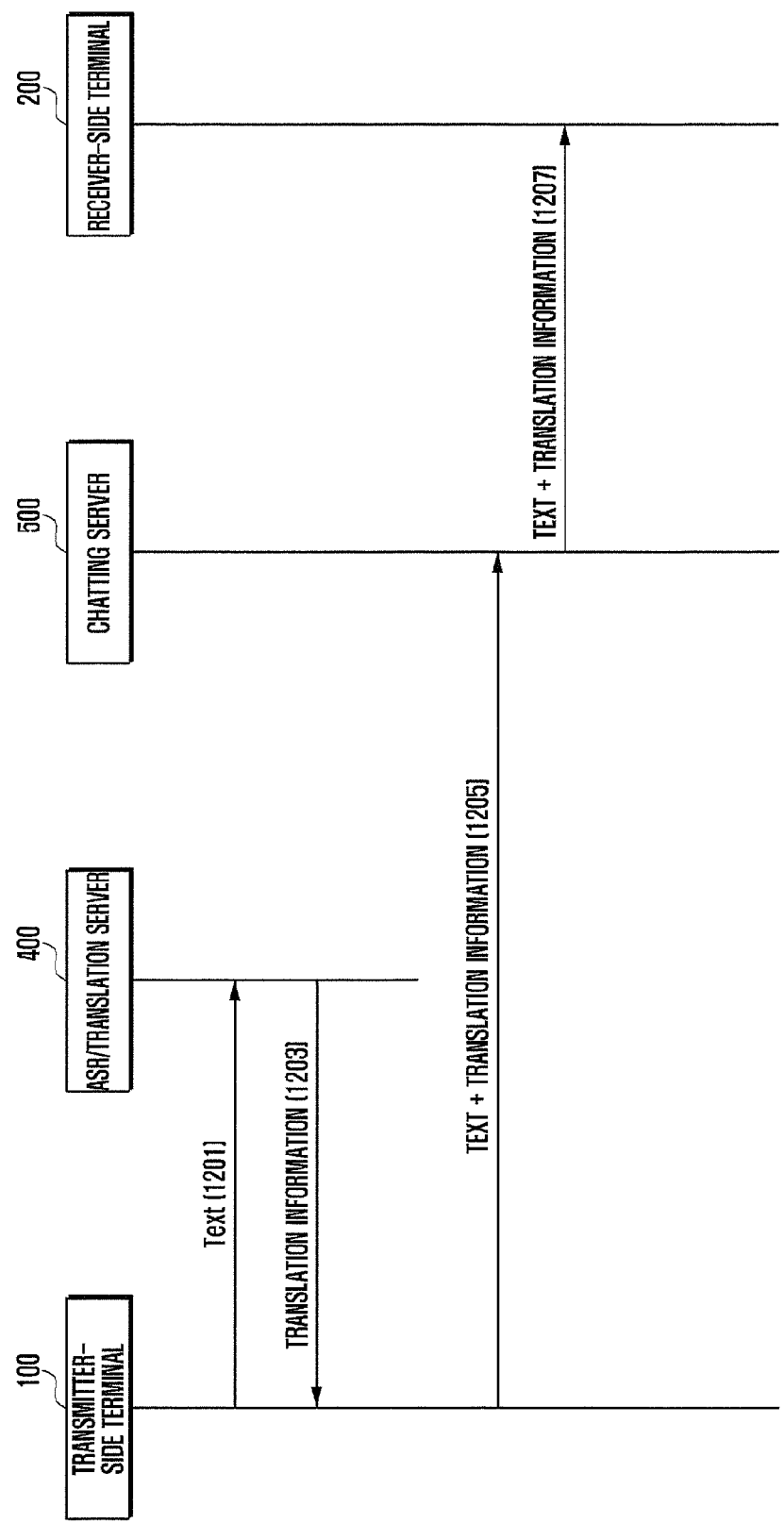
FIG. 12 is a signal flow diagram for describing an operation of a translation-based communication service according to the first embodiment of the present invention.

FIG. 12 is a signal flow diagram for describing a system operation method for supporting a translation-based communication service according to the first embodiment of the present invention. In the following description, for convenience of description, the language configured in the transmitter-side terminal 100 is referred to as the first language and the language configured in the receiver-side terminal 200 is referred to as the second language. For example, the first language can be various languages, such as Korean, English, Japanese, French, German, Spanish, and Chinese, and the second language can be a language different from the first language.

Referring to FIG. 12, in the operation of the translation-based communication service support system 10 according to the first embodiment of the present invention, the transmitter-side terminal 100 first provides a text input in the first language to the ASR/translation server 400 in step 1201. The text in the first language provided by the transmitter-side terminal 100 can be a text obtained through voice recognition of a collected voice signal. To this end, the transmitter-side terminal 100 can include a database for voice recognition. Otherwise, the transmitter-side terminal 100 can collect a voice signal input in the first language and then provide the collected voice signal, instead of the text, to the ASR/translation server 400 in step 1201. In this event, the transmitter-side terminal 100 can provide information in the second language configured in the receiver-side terminal 200, together with the voice signal, to the ASR/translation server 400. To this end, the transmitter-side terminal 100 can collect information in the second language configured in the receiver-side terminal 200 in the process of establishing a chatting service channel or through an input by a user. For the input by the user, the transmitter-side terminal 100 can provide a list from which at least one second language can be selected for translation.

When receiving a text in the first language or a voice signal in the first language from the transmitter-side terminal 100, the ASR/translation server 400 translates the received text or voice and then provides the translated information to the transmitter-side terminal 100 in step 1203. The translated information provided by the ASR/translation server 400 can include at least one of a translation text and a translation voice according to a request from the transmitter-side terminal 100. The ASR/translation server 400 identifies information in the second language among the information provided by the transmitter-side terminal 100 and searches for a database corresponding to the second language. Further, the ASR/translation server 400 configures at least one of the received text and voice in the first language into translation information including at least one of a text and voice in the second language and then provides the translation information to the transmitter-side terminal 100.

When receiving the translation information from the ASR/translation server 400, the transmitter-side terminal 100 provides the received translation information, together with the text in the first language, to the chatting server 500 in step 1205. In this event, the transmitter-side terminal 100 can provide at least one of the voice signal in the first language and the translation voice in the second language to the chatting server 500 according to the configuration by or a request from a user. Otherwise, the transmitter-side terminal 100 can provide only the translation information in the second language to the chatting server 500 without providing the text in the first language.

Then, the chatting server 500 can transfer the text and the translation information in the first language provided by the transmitter-side terminal 100 to the receiver-side terminal 200 in step 1207. The receiver-side terminal 200 can output the received text and translation information.

Figure 13:
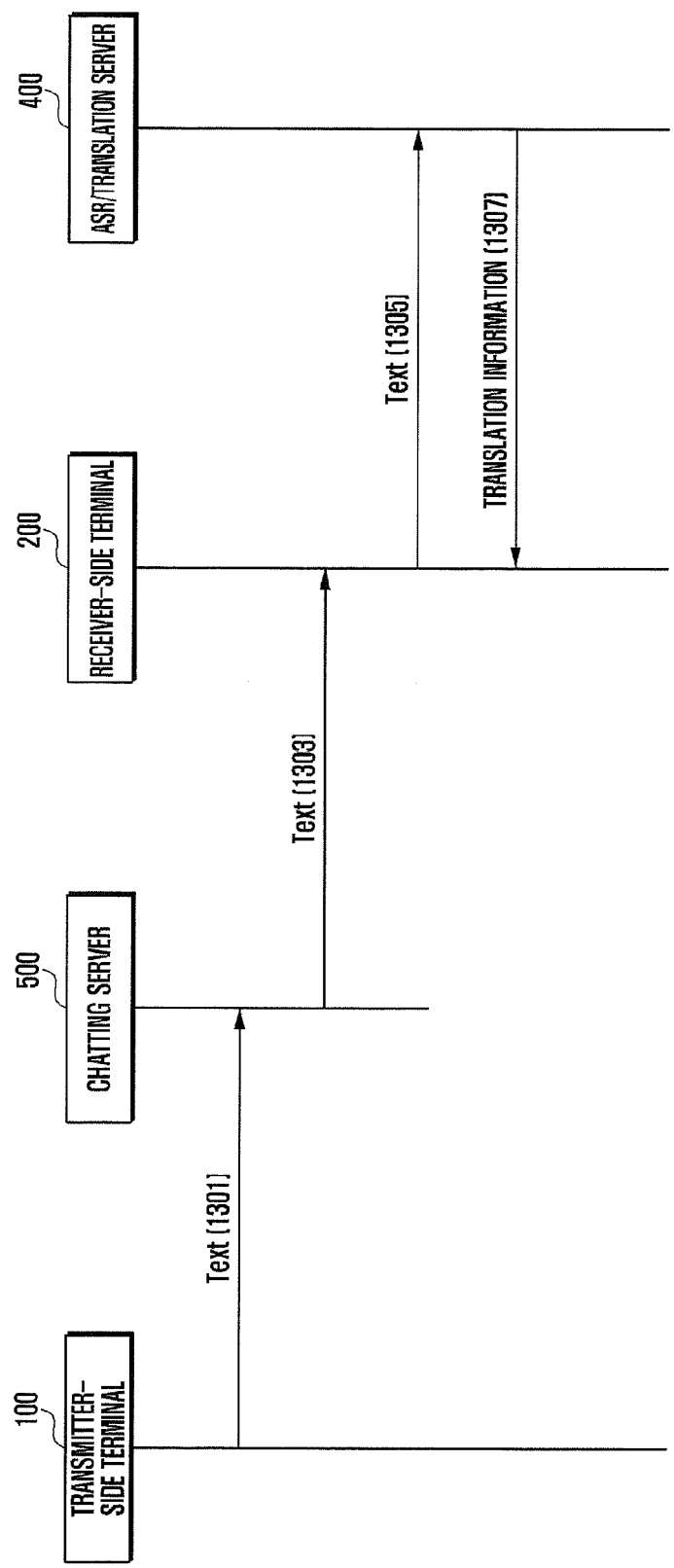
FIG. 13 is a signal flow diagram for describing an operation of a translation-based communication service according to the second embodiment of the present invention.

FIG. 13 is a signal flow diagram for describing an operation of a translation-based communication service support system 10 according to the second embodiment of the present invention.

Referring to FIG. 13, in the operation of the translation-based communication service support system 10 of the present invention, the transmitter-side terminal 100 first collects a text in the first language input by a user, and then provides the collected text to the chatting server 500 in step 1301. In this event, the transmitter-side terminal 100 transmits identification information of the receiver-side terminal 200 that will receive the text, together with the text. Also, the transmitter-side terminal 100 can collect a voice signal of a user and then provide the collected voice signal, instead of the text, to the chatting server 500. The text or voice signal provided to the chatting server 500 can be configured in the first language configured in the transmitter-side terminal 100.

Upon receiving the text in the first language from the transmitter-side terminal 100, the chatting server 500 provides the text to the receiver-side terminal 200 in step 1303. Then, the receiver-side terminal 200 provides the text in the first language provided by the chatting server 500 to the ASR/translation server 400 in step 1305. In this event, the receiver-side terminal 200 can provide information in the second language into which the text in the first language is to be translated, or the ASR/translation server 400 having received the text to be translated into the second language can identify the second language of the receiver-side terminal 200. Upon receiving a language identification request message from the ASR/translation server 400, the receiver-side terminal 200 identifies information of the language currently configured in the receiver-side terminal 200 and then provides the identified information to the ASR/translation server 400, in response to the received message. Otherwise, a user of the receiver-side terminal 200 can appoint the second language while sending a request for translation of the text in the first language to the ASR/translation server 400.

When receiving a text in the first language, information in the second language for the translation, and a request for the translation from the receiver-side terminal 200, the ASR/translation server 400 translates the received text in the first language to a text in the second language and then provides the translated text to the receiver-side terminal 200 in step 1307. In this event, according to a request from the receiver-side terminal 200 or a service policy of the ASR/translation server 400, the ASR/translation server 400 can generate a translation voice in the second language corresponding to the text in the second language, and then provide the generated translation voice, together with the text in the second language, to the receiver-side terminal 200. The receiver-side terminal 200 described above can support simultaneous outputting of the text in the first language received from the chatting server 500 and the text in the second language provided by the ASR/translation server 400 or outputting of only the text in the second language in the second display unit 240.

Meanwhile, in the operation of the translation-based communication service support system 10 according to the second embodiment of the present invention, the transmitter-side terminal 100 can collect a voice signal in the first language and then provide the collected voice signal to the receiver-side terminal 200 through the chatting server 500. Then, the receiver-side terminal 200 can send the voice signal in the first language, together with information in the second language and a request for translation of the voice signal, to the ASR/translation server 400. Then, the ASR/translation server 400 can translate the voice signal in the first language provided by the receiver-side terminal 200 to a translation voice in the second language and then provide the translated voice to the receiver-side terminal 200. Here, the ASR/translation server 400 can voice-recognize the voice signal in the first language as a text in the first language, translate the voice-recognized text into a text in the second language to generate a translation text, and then convert the generated translation text to a translation voice in the second language. Upon receiving a translation voice in the second language in addition to the translation text in the second language from the ASR/translation server 400, the receiver-side terminal 200 can output the received translation voice through the second speaker 233 according to the configuration by the user. In this event, the receiver-side terminal 200 can simultaneously output the translation text in the second language and the translation voice in the second language.

Figure 14:
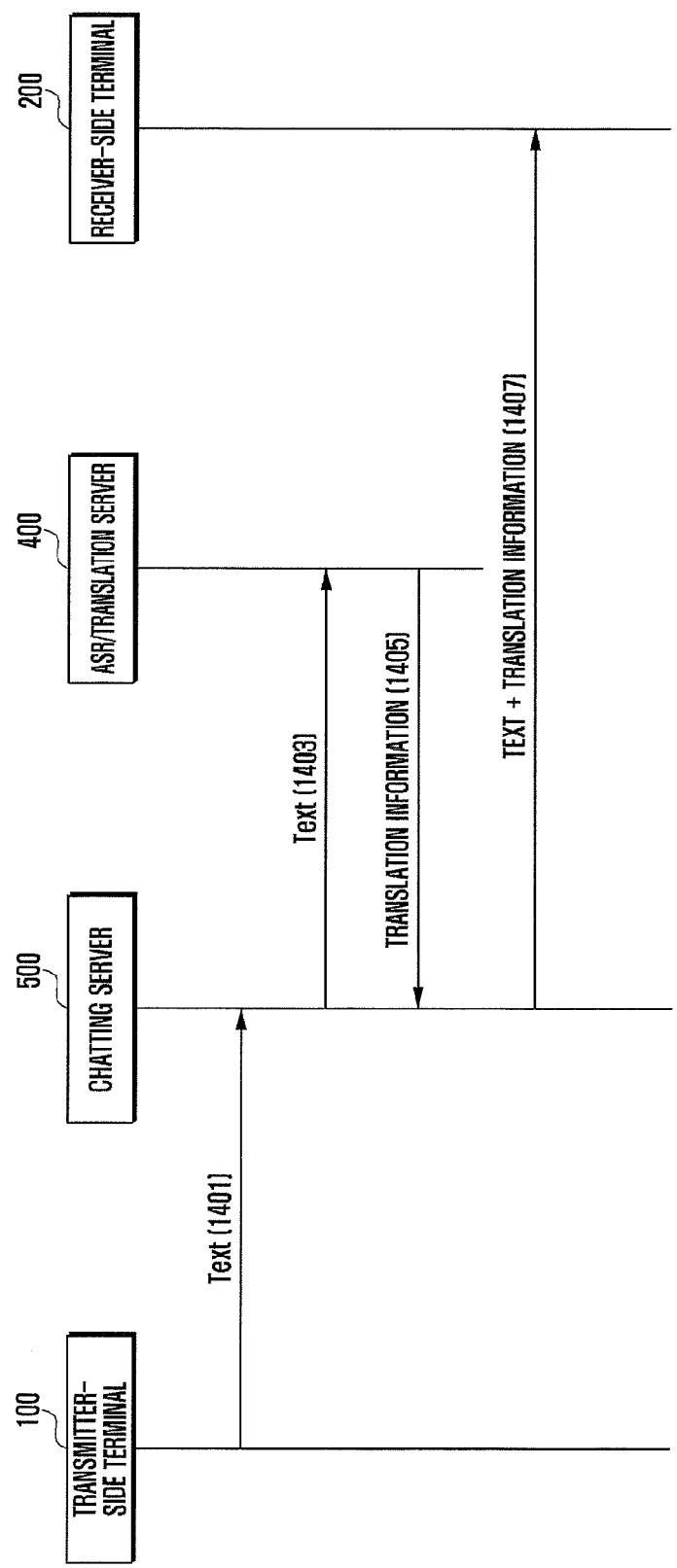
FIG. 14 is a signal flow diagram for describing an operation of a translation-based communication service according to the third embodiment of the present invention.

FIG. 14 is a signal flow diagram for describing an operation of a translation-based communication service according to the third embodiment of the present invention.

Referring to FIG. 14, in the operation of the translation-based communication service support system 10 according to the third embodiment of the present invention, the transmitter-side terminal 100 first provides a text in the first language input by a user to the chatting server 500 in step 1401. In this event, the transmitter-side terminal 100 can generate a message requesting translation of the text in the first language into the second language and transmit the generated message, together with the text, to the chatting server 500. Otherwise, the transmitter-side terminal 100 can transmit a message requesting application of the translation mode to the chatting server 500. Then, in response to a request from the user, the transmitter-side terminal 100 can transmit a message requesting deactivation of the translation mode to the chatting server 500 in order to prevent application of the translation mode.

Otherwise, the transmitter-side terminal 100 can open a chatting room in a one-to-one form or a one-to-multiple form with the receiver-side terminal 200 and can determine whether to apply the translation mode to each open chatting room. When a translation mode application request occurs for a particular chatting room, the transmitter-side terminal 100 can provide corresponding information to the chatting server 500 to request default application of the translation mode to a message transmitted through the particular chatting room. Meanwhile, when the chatting room configured to support the translation mode is terminated, the transmitter-side terminal 100 can transmit a message requesting deactivation of the translation mode to the chatting server 500.

Upon receiving a particular text or a text of a particular chatting room, to which the translation mode is requested to be applied, the chatting server 500 can provide the text to the ASR/translation server 400 in step 1403. Then, the chatting server 500 can transfer of the information in the second language provided by the transmitter-side terminal 100 to the ASR/translation server 400 to request the ASR/translation server 400 to translate the text in the first language to a text in the second language. The ASR/translation server 400 identifies the text in the first language and the information in the second language provided by the chatting server 500 and searches for a database matching the languages. Further, the ASR/translation server 400 can translate the text in the first language to the text in the second language based on a found translation database. Further, the ASR/translation server 400 can provide the translation text in the second language to the chatting server 500. In this event, when a translation text in the second language is generated, the ASR/translation server 400 can generate a translation voice in the second language corresponding to the translation text in the second language. Further, the ASR/translation server 400 can provide translation information including not only the translation text but also the translation voice to the chatting server 500 according to the service policy of the ASR/translation server 400 or a request from the chatting server 500 in step 1405.

When receiving the translation information from the ASR/translation server 400, the chatting server 500 can transfer the received translation information together with the text in the first language provided by the transmitter-side terminal 100 to the receiver-side terminal 200 in step 1407. The receiver-side terminal 200 can output the text in the first language together with the translation information. Meanwhile, the chatting server 500 can provide only the translation information without providing the text in the first language to the receiver-side terminal 200 in step 1407. Then, the receiver-side terminal 200 can output only the translation information in the second display unit 240.

Meanwhile, the transmitter-side terminal 100 can collect a voice signal in the first language and provide the collected voice signal to the chatting server 500, and the chatting server 500 can request the ASR/translation server 400 to translate the voice signal in the first language.

Figure 15:
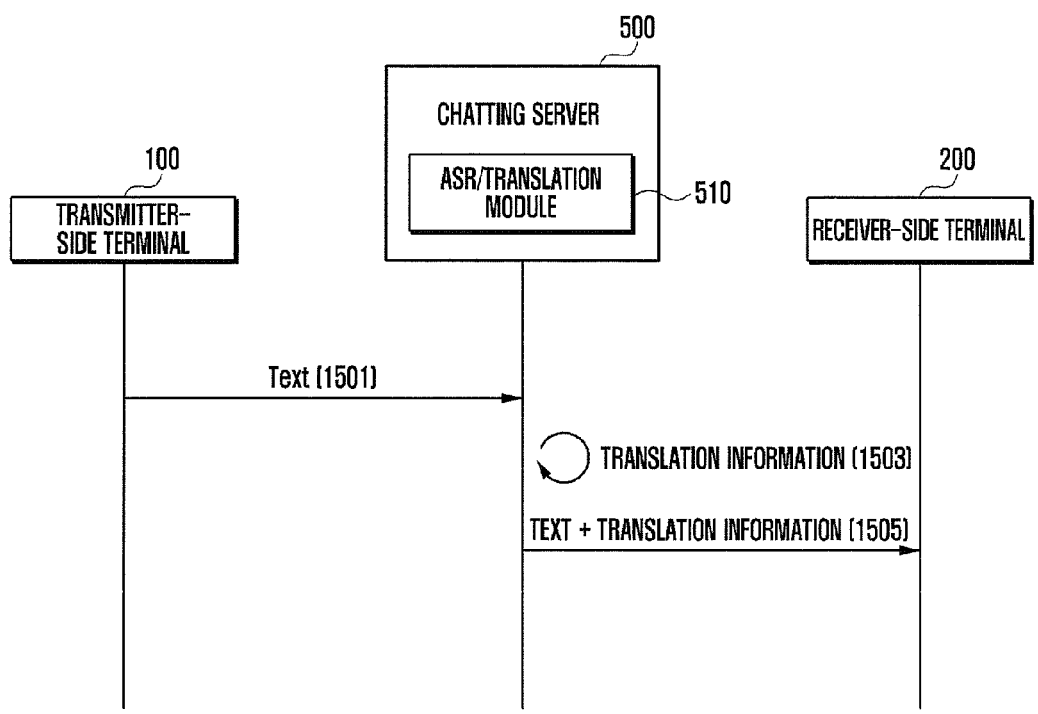
FIG. 15 is a signal flow diagram for describing an operation of a translation-based communication service according to the fourth embodiment of the present invention.

FIG. 15 is a signal flow diagram for describing an operation method of a translation-based communication service support system 10 according to the fourth embodiment of the present invention.

Referring to FIG. 15, in the operation of the translation-based communication service support system 10 of the present invention, the transmitter-side terminal 100 first collects a text in the first language input by a user of the transmitter-side terminal 100, and then transmits the collected text in the first language to the chatting server 500 including the ASR/translation module 510 in step 1501. In this event, the transmitter-side terminal 100 can provide information in the second language for the translation, together with the text, to the chatting server 500.

When receiving the text in the first language and the information in the second language from the transmitter-side terminal 100, the chatting server 500 can generate translation information based on the received text and information by using the ASR/translation module 510 in step 1503. In this event, the chatting server 500 generates a translation text obtained by translating the text in the first language into the second language. Further, the chatting server 500 can generate a voice in the second language corresponding to the translation text in the second language in response to a request from at least one of the transmitter-side terminal 100 and the receiver-side terminal 200 or according to the service policy. To this end, the ASR/translation module 510 can include a database capable of generating the translation text and the translation voice. That is, the ASR/translation module 510 can include a text translation database arranged to translate a text in the first language to a text in the second language and a voice-for-TTS database arranged to convert a text in the second language to a voice in the second language.

Next, when the translation information is generated, the chatting server 500 provides the generated translation information to the receiver-side terminal 200 in step 1505. Then, the chatting server 500 can transfer the text in the first language together with the translation information provided by the transmitter-side terminal 100 to the receiver-side terminal 200. Otherwise, the chatting server 500 can prohibit the transmission of the text in the first language according to a request from or a configuration of the transmitter-side terminal 100 or the receiver-side terminal 200.

Upon receiving the translation information and the text in the first language from the chatting server 500, the receiver-side terminal 200 can output at least one of the received translation information and the received text in the first language in the second display unit 240. When the translation information includes a translation voice in the second language, the receiver-side terminal 200 supports outputting of the translation voice through the second speaker 233.

Meanwhile, the transmitter-side terminal 100 can provide a voice signal in the first language instead of the text in the first language to the chatting server 500, and the chatting server 500 voice-recognizes the voice signal in the first language to obtain a text in the first language and then generate at least one of a translation text and a translation voice in the second language based on the obtained text in the first language.

In addition, the translation-based communication service support system 10 according to the first to fourth embodiments of the present invention can provide handwriting information of the transmitter-side terminal 100 to the ASR/translation server 400 or the chatting server 500 including the ASR/translation module 510. Then, the ASR/translation server 400 or the ASR/translation module 510 recognizes text information by filtering the received handwriting image information, and generates and provides translation information of another language corresponding to the recognized text information.

Figure 16:
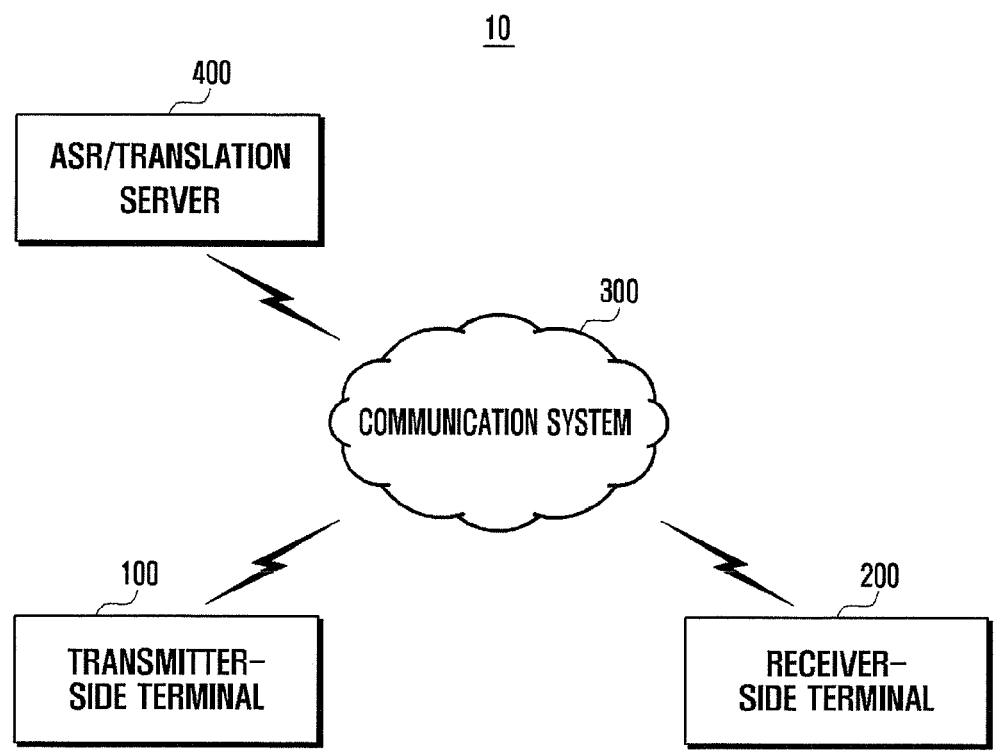
FIG. 16 is a diagram schematically illustrating a construction of a system for supporting a translation-based communication service according to fifth and sixth embodiments of the present invention.

FIG. 16 is a diagram schematically illustrating a construction of a system for operation of a translation-based communication service according to fifth and sixth embodiments of the present invention.

Referring to FIG. 16, a translation-based communication service operation system 10 of the present invention includes an ASR/translation server 400, a transmitter-side terminal 100, a receiver-side terminal 200, and a communication system 300.

This construction of the translation-based communication service support system 10 according to the fifth and sixth embodiments is different from that of the translation-based communication service support system according to the first to fourth embodiments in that the chatting server 500 is omitted in this construction. The system shown in FIG. 16 including this construction can support a translation-based communication service in execution of a voice communication or a video communication. That is, the transmitter-side terminal 100 and the receiver-side terminal 200 can use a translation-based communication service of the present invention by using the ASR/translation server 400 at the time of performing a voice communication or a video communication.

The ASR/translation server 400 is connected to the communication system 300 and supports a translation-based communication service of the present invention in response to a request from at least one of the transmitter-side terminal 100 and the receiver-side terminal 200. For example, the ASR/translation server 400 can receive a translation request from the transmitter-side terminal 100 performing a voice communication or a video communication with the receiver-side terminal 200, generate translation information corresponding to the translation request, and then provide the generated translation information to at least one of the transmitter-side terminal 100 and the receiver-side terminal 200. When receiving a voice signal in the first language from the transmitter-side terminal 100, the ASR/translation server 400 voice-recognizes the received voice signal in the first language to generate a text in the first language, generates a text in the second language corresponding to the text in the first language, and then provides the generated text to the transmitter-side terminal 100 and the receiver-side terminal 200 or to only the transmitter-side terminal 100.

The transmitter-side terminal 100 accesses the ASR/translation server 400 through the communication system 300 and provides a voice signal in the first language to the ASR/translation server 400. Further, the transmitter-side terminal 100 can receive a translation text in the second language corresponding to the voice signal in the first language from the ASR/translation server 400. The received translation text in the second language can be output in the first display unit 140. Further, when the ASR/translation server 400 is designed such that it cannot directly provide the translation text in the second language to the receiver-side terminal 200, the transmitter-side terminal 100 can provide the translation text in the second language received from the ASR/translation server 400 together with the voice signal in the first language to the receiver-side terminal 200.

The receiver-side terminal 200 establishes a communication channel for a voice communication or a video communication with the transmitter-side terminal 100, and receives and outputs a voice signal or a video signal provided by the transmitter-side terminal 100. Especially, the receiver-side terminal 200 can receive a translation text in the second language translated from a text in the first language provided by the transmitter-side terminal 100. Upon receiving the translation text in the second language, the receiver-side terminal 200 can output the translation text in the second display unit 240. During a video communication, the receiver-side terminal 200 can output the received translation text together with a video signal. Especially, when the transmitter-side terminal 100 provides image information including handwriting information, the receiver-side terminal 200 can output the received translation text in the background area excluding the area in which the text of the handwriting is recorded.

Figure 17:
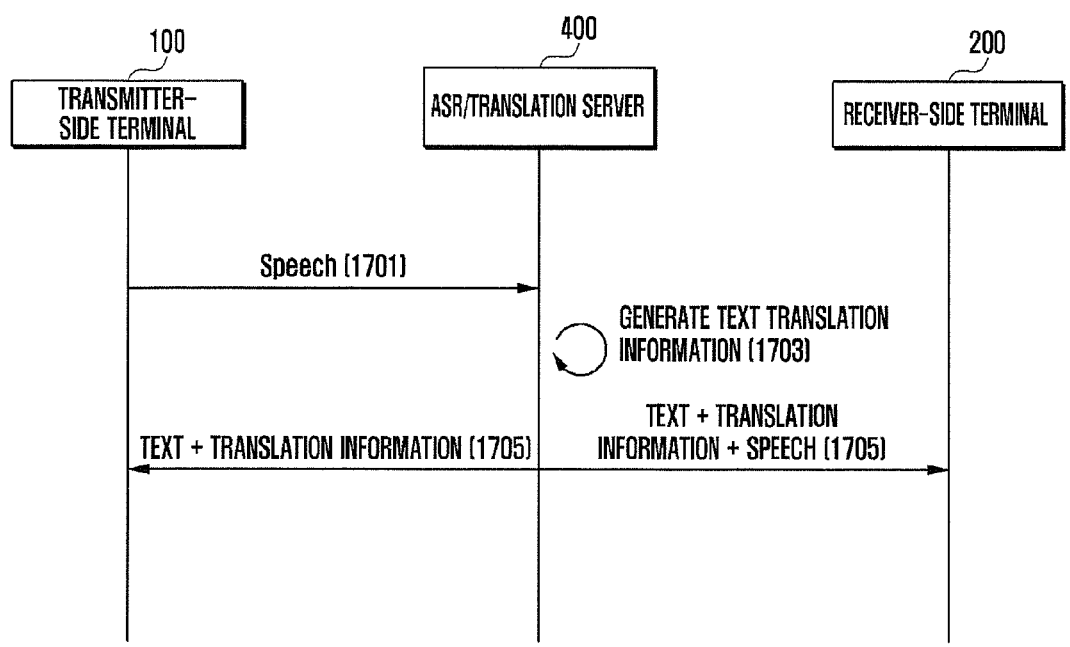
FIG. 17 is a signal flow diagram for describing an operation of a translation-based communication service according to the fifth embodiment of the present invention.

FIG. 17 is a signal flow diagram for describing an operation of a translation-based communication service support system 10 according to the fifth embodiment of the present invention.

Referring to FIG. 17, in the operation of the system 10 of the present invention, the transmitter-side terminal 100 first establishes a communication channel with the receiver-side terminal 200 in order to perform a voice communication or a video communication including a voice signal with the receiver-side terminal 200. In this event, a user of the transmitter-side terminal can request activation of the translation mode. To this end, the transmitter-side terminal 100 provides a menu item or an icon for selection of the translation mode and the user then selects the menu item or icon to request an operation of a communication service with the receiver-side terminal 200 in the translation mode. Upon receiving the request for activation of the translation mode, the transmitter-side terminal 100 can secure address information of a predefined ASR/translation server 400 and access the ASR/translation server 400 based on the secured address information. When a predefined ASR/translation server 400 does not exist, the transmitter-side terminal 100 can provide a screen for input of an ASR/translation server 400, and the user can input address information of the ASR/translation server 400 by himself or herself. Otherwise, after accessing the communication system 300, the transmitter-side terminal 100 can search for an ASR/translation server based on a search engine provided by an Internet network, and select and access a particular ASR/translation server, for example, the first item in the search list, by default.

The transmitter-side terminal 100 having accessed the ASR/translation server 400 provides a voice (or speech) signal in the first language input by a user to the ASR/translation server 400 in step 1701. Then, the ASR/translation server 400 voice-recognizes the received voice signal to convert it to a text in the first language, and generates translation information including a translation text in the second language based on the text in the first language in step 1703. To this end, the ASR/translation server 400 can include a voice recognition database for voice recognition of a voice signal in the first language and a translation database for translation from a text in the first language to a text in the second language.

Next, the ASR/translation server 400 can provide the text in the first language and the translation information including translation text in the second language to the transmitter-side terminal 100 in step 1705. Further, the ASR/translation server 400 can provide the text in the first language, the translation information including the translation text in the second language and the voice signal in the first language to the receiver-side terminal 200 in step 1705.

Meanwhile, the ASR/translation server 400 can generate a translation voice in the second language corresponding to the translation text in the second language in step 1703. Further, the ASR/translation server 400 can provide a translation voice in the second language without transmitting the voice signal in the first language to the receiver-side terminal 200 in step 1705.

Through the above process, the transmitter-side terminal 100 can identify which state the translation information provided to the receiver-side terminal 200 corresponds to. Therefore, the transmitter-side terminal 100 can support transmission of another text or translation text or re-input of a voice signal according to a request from a user.

In the above description, the ASR/translation server 400 transmits the text in the first language and translation information to the transmitter-side terminal 100 simultaneously while transmitting the text in the first language, translation information and the voice signal in the first language to the receiver-side terminal 200. However, according to the design change, the ASR/translation server 400 can first perform the transmission to the transmitter-side terminal 100 and then the transmission to the receiver-side terminal 200 after the identification by the transmitter-side terminal 100. This scheme can enable the transmitter-side terminal 100 to previously identify the information transmitted to the receiver-side terminal 200 to enable the user to previously identify the exactness of the transferred information, so as to prevent transfer of wrong information.

Figure 18:
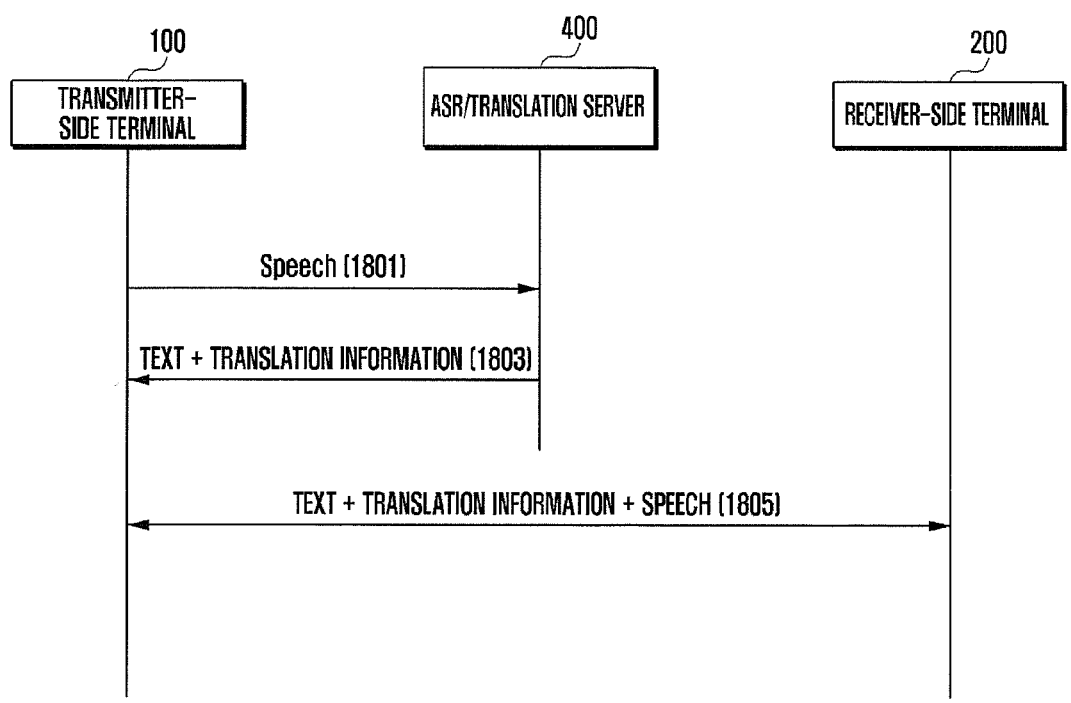
FIG. 18 is a signal flow diagram for describing an operation of a translation-based communication service according to the sixth embodiment of the present invention.

FIG. 18 is a signal flow diagram for describing an operation of a translation-based communication service support system 10 according to the sixth embodiment of the present invention.

Referring to FIG. 18, in the operation of the translation-based communication service support system 10 of the present invention, when a user inputs a voice signal in the first language to be transmitted to the receiver-side terminal 200, the transmitter-side terminal 100 transmits the input voice signal in the first language to the ASR/translation server 400 in step 1801. In this step, the transmitter-side terminal 100 can perform a device connection process for transmission of the voice signal in the first language to the ASR/translation server 400. To this end, the ASR/translation server 400 can previously store and operate address information. Especially, when receiving an input event according to selection of the translation mode from the user in a state in which the transmitter-side terminal 100 is configured to operate a communication service with the receiver-side terminal 200, the transmitter-side terminal 100 can automatically access the ASR/translation server 400 to prepare the transmission of the voice signal in the first language. In this event, the transmitter-side terminal 100 can provide information in the second language for translation of the voice signal in the first language to the ASR/translation server 400. To this end, the transmitter-side terminal 100 can collect language configuration information of the receiver-side terminal 200. The collection of the language configuration information can be performed in response to a request from the receiver-side terminal 200 to the second controller 260 or by a designation by the user of the transmitter-side terminal 100.

When receiving the voice signal in the first language from the transmitter-side terminal 100, the ASR/translation server 400 generates translation information including a translation text in the second language requested by the transmitter-side terminal 100 from the received voice signal in the first language. To this end, the ASR/translation server 400 voice-recognizes the voice signal in the first language based on pre-stored voice recognition database and translation database to generate a text in the first language, and converts the generated text in the first language to the text in the second language. Next, the ASR/translation server 400 can provide the text in the first language and the translation information including the translation text in the second language to the transmitter-side terminal 100 in step 1803. In this step, the ASR/translation server 400 can generate a translation voice in the second language based on the translation text in the second language and then transmit the translation information including the translation voice in the second language to the transmitter-side terminal 100.

Next, the transmitter-side terminal 100 can transmit the text in the first language and the translation information in the second language received from the ASR/translation server 400, together with the voice signal in the first language, to the receiver-side terminal 200 in step 1805. In this event, the transmitter-side terminal 100 can output the text in the first language and the translation information in the second language received from the ASR/translation server 400 in the first display unit 140, and a user can generate an input event for identifying and requesting transmission of the information. When necessary, the user of the transmitter-side terminal can cancel the transmission of the text in the first language and the translation information in the second language and input a new voice signal to request transmission of the voice signal to the ASR/translation server 400. Meanwhile, in step 1805, instead of transmitting the voice signal in the first language to the receiver-side terminal 200, the transmitter-side terminal 100 can provide translation voice in the second language to the receiver-side terminal 200.

Figure 19:
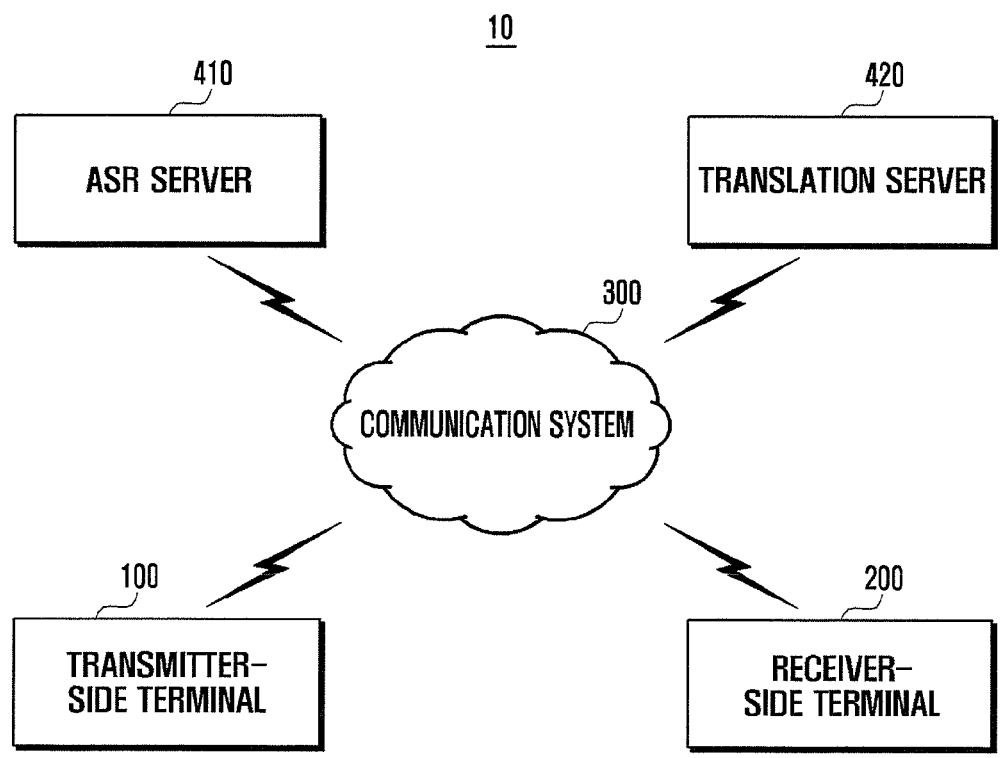
FIG. 19 is a diagram schematically illustrating a construction of a system for supporting a translation-based communication service according to seventh and eighth embodiments of the present invention.

FIG. 19 is a diagram schematically illustrating a construction of a system 10 supporting the operation of a translation-based communication service according to seventh and eighth embodiments of the present invention.

Referring to FIG. 19, the system 10 of the present invention includes a transmitter-side terminal 100, a receiver-side terminal 200, an ASR server 410, and a translation server 420.

The system 10 described above can be designed to have a construction in which the transmitter-side terminal 100 transmits a voice signal to the ASR server 410, receives a text in the first language obtained by voice-recognizing the voice signal from the ASR server 410, and then transfers the text in the first language to the translation server 420. Then, the translation server 420 translates the text in the first language to a text in the second language to generate translation information, and then provides the generated translation information to the receiver-side terminal 200 or transfers the translation information to the transmitter-side terminal 100 so that the transmitter-side terminal 100 provides the translation information to the receiver-side terminal 200.

The system described above supports an adaptive operation according to the state of the network. For example, when it is more difficult for the transmitter-side terminal 100 than for the receiver-side terminal 200 to access the ASR server 410, the transmitter-side terminal 100 can provide a voice signal in the first language to the receiver-side terminal 200 and the receiver-side terminal 200 can access the ASR server 410 to request conversion of the voice signal in the first language to a text in the first language. Further, the design of the system 10 can be modified such that the receiver-side terminal 200 provides the text in the first language received from the ASR server 410 to the translation server 420 and receives at least one of the translation text in the second language and the translation voice in the second language from the translation server 420.

In the system 10, in order to support the functions described above, the transmitter-side terminal 100 and the receiver-side terminal 200 perform the network evaluation and share the network evaluation information, so that one party capable of more easily accessing the ASR server 410 and the translation server 420 performs the translation process. The sharing of the network evaluation information can be performed while the transmitter-side terminal 100 and the receiver-side terminal 200 are requested to perform a communication service based on a voice signal, for example, a voice communication or a video communication, and can be repeatedly performed.

The ASR server 410 is an apparatus supporting a voice recognition function, which previously constructs a voice recognition database for voice recognition and then voice-recognizes a voice transferred from the transmitter-side terminal 100 based on the voice recognition database. Further, the ASR server 410 can provide a text of a particular language generated as a result of the voice recognition to the transmitter-side terminal 100. Since the ASR server 410 supports the voice recognition function in an environment in which the transmitter-side terminal 100 and the receiver-side terminal 200 use different languages, the ASR server 410 can construct a database for at least two languages. That is, the ASR server 410 can include a voice recognition database in the first language configured in the first terminal functioning as a transmitter and a voice recognition database in the second language configured in the second terminal functioning as a receiver. The ASR server 410 as described above can receive a request for voice recognition of a voice signal in the first language or a request for voice recognition of a voice signal in the second language from the transmitter-side terminal 100 or the receiver-side terminal 200 according to the network state. Then, the ASR server 410 performs voice recognition of a corresponding language to generate a text and then provides the text to a terminal requested the voice recognition.

While receiving the request for translation from the transmitter-side terminal 100 or the receiver-side terminal 200, the translation server 420 receives the text in the first language and information in the second language for translation of the text in the first language. In addition, the translation server 420 can receive communication connection information relating to the receiver-side terminal 200 from the transmitter-side terminal 100 so that the translation server 420 can transmit, by itself, the translation information in the second language to the receiver-side terminal 200. In this event, when receiving a request for translation of the text in the first language from the receiver-side terminal 200, the translation server 420 does not receive separate communication connection information. Then, the ASR/translation server 420 can provide the translation information in the second language obtained by translating the text in the first language to the receiver-side terminal 200 requested the translation.

Hereinafter, examples of the translation-based operation of the system 10 will be described in more detail with reference to the accompanying drawings.

Figure 20:
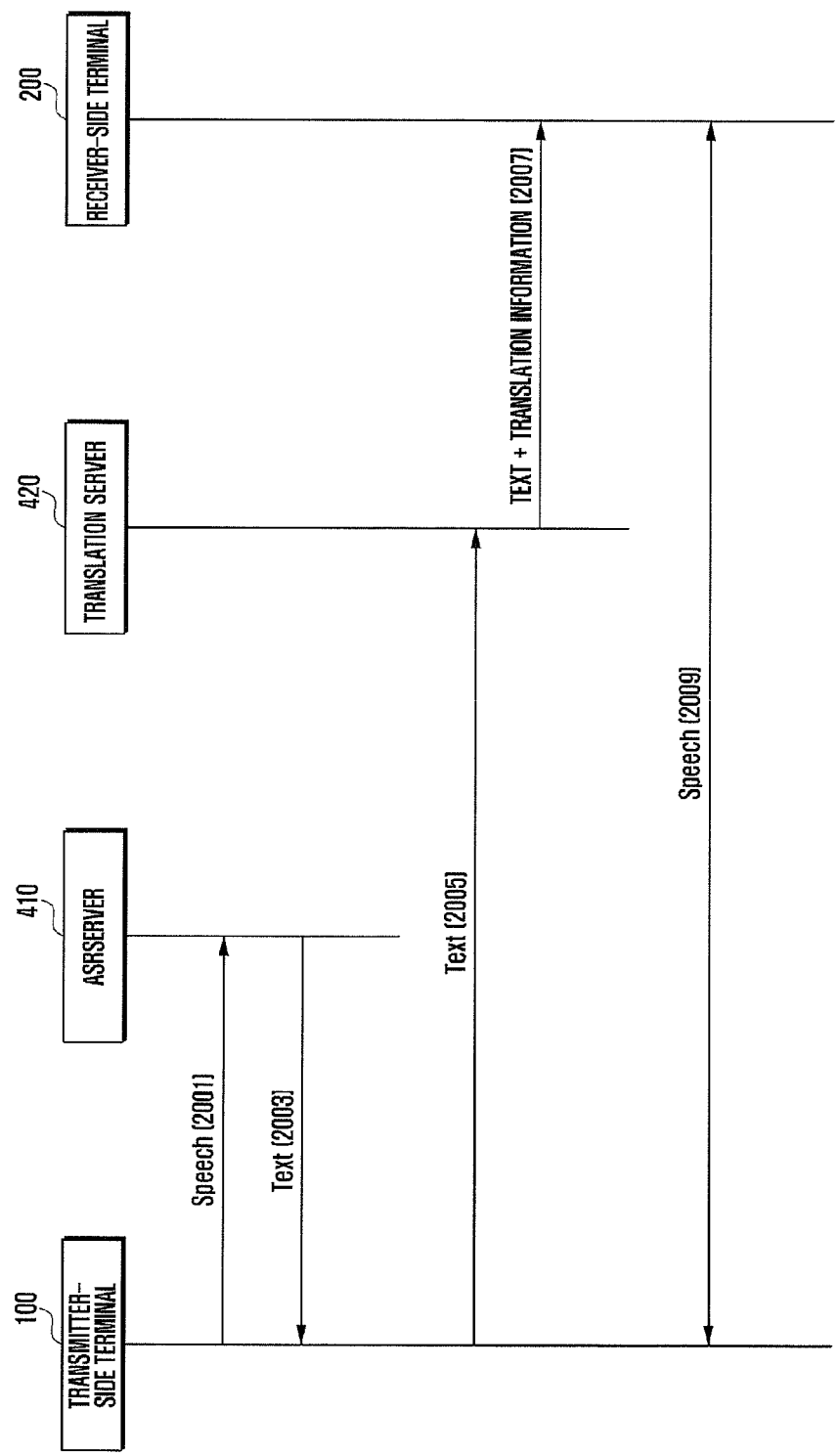
FIG. 20 is a signal flow diagram for describing an operation of a translation-based communication service according to the seventh embodiment of the present invention.

FIG. 20 is a signal flow diagram for describing an operation of a translation-based communication service support system 10 according to the seventh embodiment of the present invention.

Referring to FIG. 20, the transmitter-side terminal 100 can establish a communication connection for operation of a communication service with the receiver-side terminal 200 and can collect a voice signal in the first language from a user in a state in which the translation mode has been configured. Then, the transmitter-side terminal 100 provides the collected voice signal in the first language to the ASR server 410 in step 2001. To this end, the transmitter-side terminal 100 can previously store access information of the ASR server 410 and access the ASR server 410 when the translation mode has been configured.

When receiving the voice signal in the first language from the transmitter-side terminal 100, the ASR server 410 voice-recognizes the voice signal to generate a text in the first language, and then provides the text in the first language to the transmitter-side terminal 100 in step 2003. Meanwhile, even when receiving a voice signal in the first language from the receiver-side terminal 200, the ASR/translation server 410 can provide a text in the first language obtained by voice-recognizing the voice signal to the receiver-side terminal 200.

Next, the transmitter-side terminal 100 provides the received text in the first language to the translation server 420 in step 2005. To this end, the transmitter-side terminal 100 can previously store access information of the translation server 420, and provide information in the second language for the translation together when providing the text in the first language.

When receiving a request for translation of the text in the first language from the transmitter-side terminal 100, the translation server 420 generates a translation text corresponding to the provided information in the second language and then provides the translation text as the translation information to the receiver-side terminal 200 in step 2007. In this step, the translation server 420 can generate a translation voice in the second language corresponding to the translation text and then provide translation information including the translation voice to the receiver-side terminal 200. Meanwhile, the transmitter-side terminal 100 can provide the voice signal in the first language to the receiver-side terminal 200 in step 2009.

The method described above corresponds to a method in which the transmitter-side terminal 100 identifies only the text information in the first language to be translated. This method is useful when the user of the transmitter-side terminal 100 cannot actually interpret the translated text in the second language.

Figure 21:
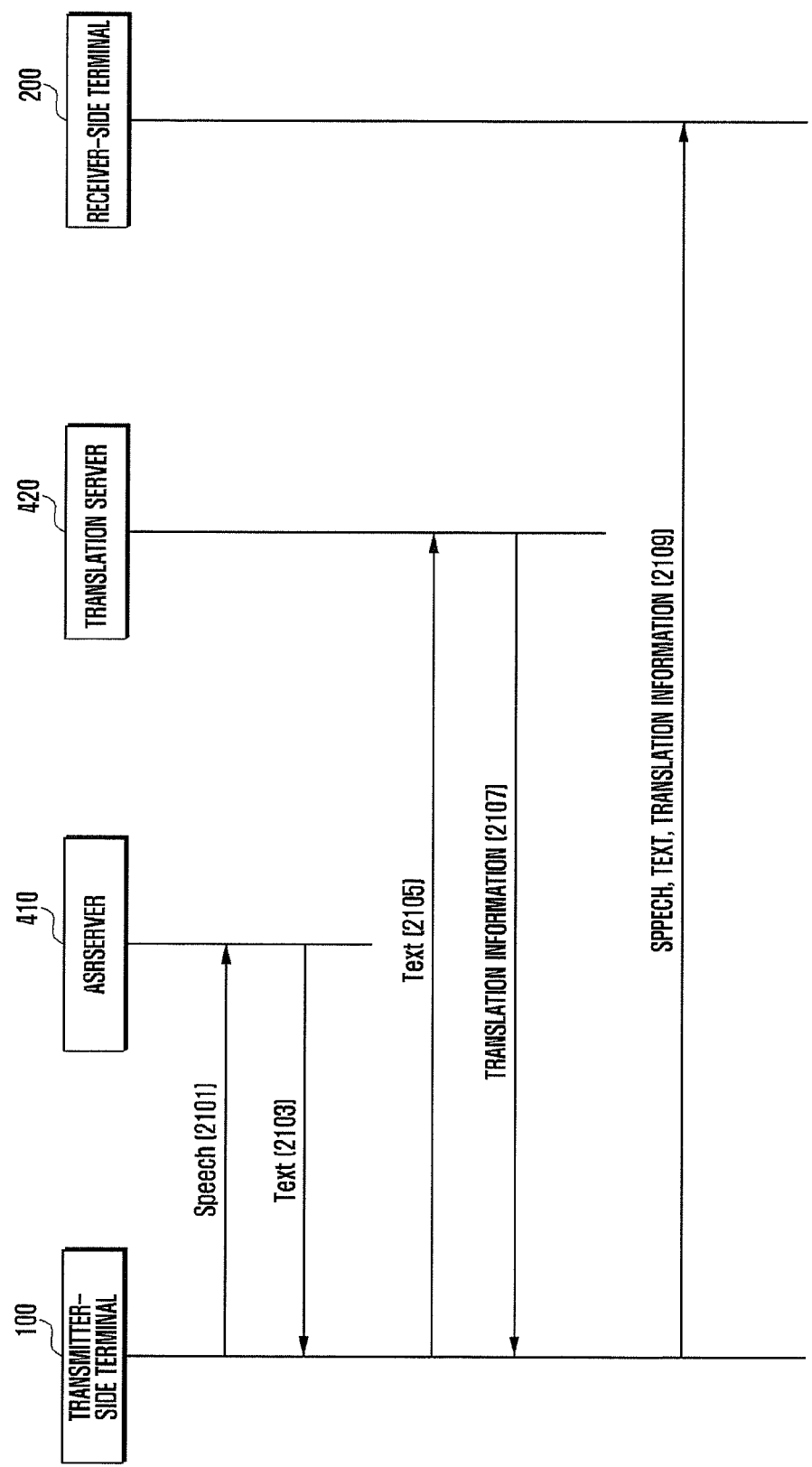
FIG. 21 is a signal flow diagram for describing an operation of a translation-based communication service according to the eighth embodiment of the present invention.

FIG. 21 is a signal flow diagram for describing an operation of a translation-based communication service support system 10 according to the eighth embodiment of the present invention.

Referring to FIG. 21, in the operation of the system 10 of the present invention, the transmitter-side terminal 100 first establishes a communication channel with the receiver-side terminal 200 and the user can configure the translation mode. In this state, when the user inputs a voice signal in the first language, the transmitter-side terminal 100 transmits the voice signal in the first language to the ASR server 410 in step 2101.

When receiving the voice signal in the first language from the transmitter-side terminal 100, the ASR server 410 voice-recognizes the voice signal to generate a text in the first language corresponding to the voice signal in the first language. Then, the ASR server 410 can provide the generated text in the first language to the transmitter-side terminal 100 in step 2103.

Thereafter, the transmitter-side terminal 100 provides the text in the first language to the translation server 420 in step 2105. In this event, the transmitter-side terminal 100 can provide information in the second language for the translation together with the text. The information in the second language can be collected in the process in which the transmitter-side terminal 100 establishes a communication channel with the receiver-side terminal 200.

Upon receiving a request for translation of the text in the first language into the second language from the transmitter-side terminal 100, the translation server 420 generates a translation text in the second language by using a pre-stored translation database. Further, the translation server 420 can provide the translation text as translation information to the transmitter-side terminal 100 in step 2107. In this step, the translation server 420 can generate a translation voice corresponding to the translation text and then provide translation information including the translation voice together with the translation text to the receiver-side terminal 200.

Upon receiving the translation information from the translation server 420, the transmitter-side terminal 100 provides the received translation information to the receiver-side terminal 200 in step 2109. In this event, the transmitter-side terminal 100 can provide the voice signal in the first language and the text in the first language together with the translation information to the receiver-side terminal 200.

The method described above corresponds to a method in which the transmitter-side terminal 100 identifies both the text in the first language to be translated and the translation text. This method is useful when the user of the transmitter-side terminal 100 can interpret the translated text in the second language to a certain degree. That is, when the user of the transmitter-side terminal 100 is poor at writing but is good at reading, this method can be a useful solution.

Meanwhile, the system 10 described above can have a modified design to extract a text from handwritten information and provide translation information corresponding to the extracted text. To this end, a server capable of extracting a text from handwritten information and then providing the text can be included, instead of the ASR server, in the system.

Figure 22:
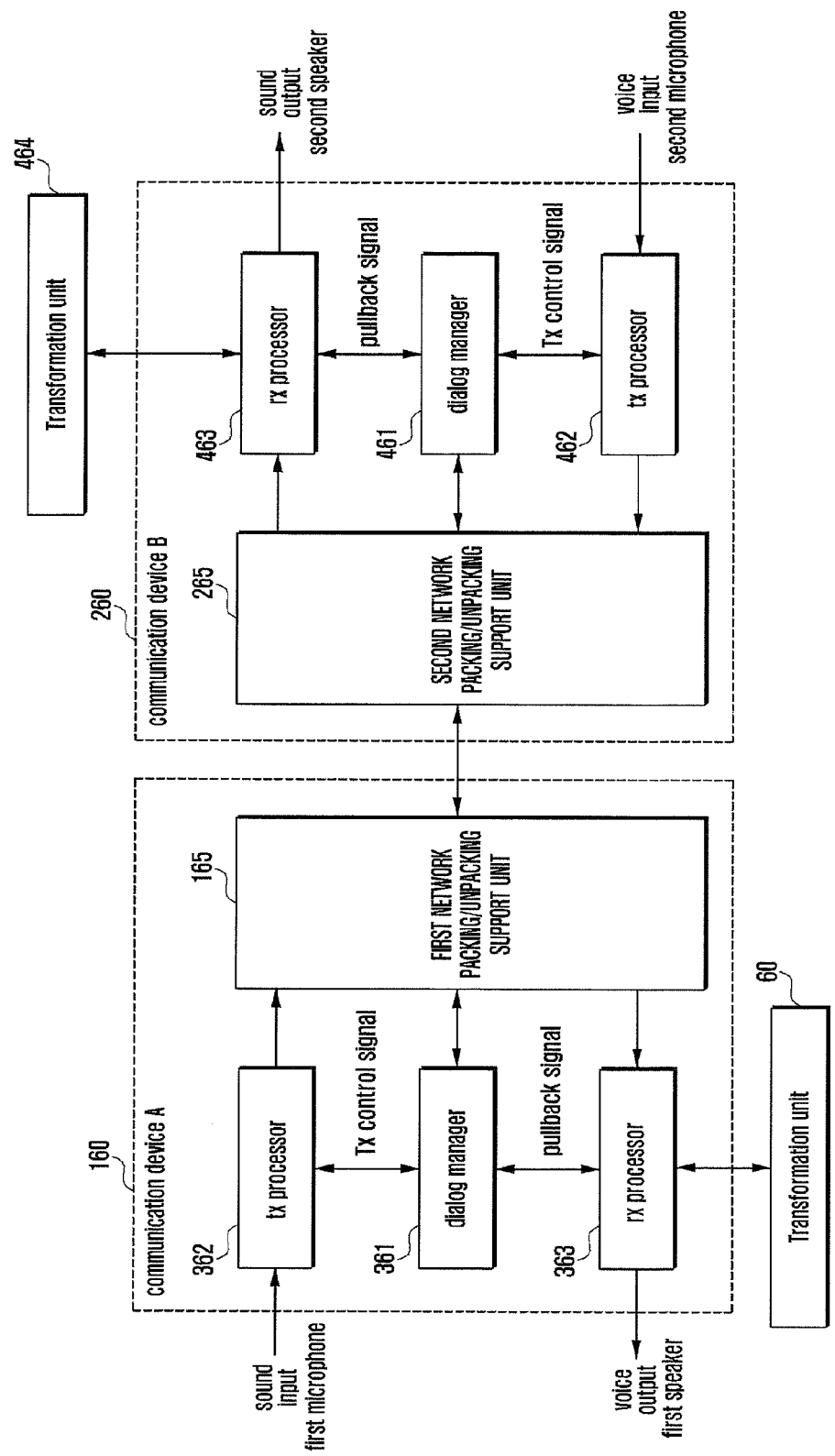
FIG. 22 is a block diagram illustrating the controller configuration of and signal flow between terminals for describing management of dialog between the terminals in a process of supporting a communication service according to an embodiment of the present invention.

FIG. 22 is a block diagram illustrating the controller configuration of and signal flow between terminals for describing management of dialog between the terminals in a process of supporting a communication service according to an embodiment of the present invention.

Referring again to FIG. 22, the first controller 160 included in the transmitter-side terminal 100 of the present invention includes a first transmission processor 362, a first dialog manager 361, a first reception processor 363, a translation unit 60, and a first network packing/unpacking support unit 165. Further, the second controller 260 included in the receiver-side terminal 200 of the present invention includes a second reception processor 463, a second dialog manager 461, a second transmission processor 462, a reception translation unit 464, and a second network packing/unpacking support unit 265.

The transmitter-side terminal 100 and the receiver-side terminal 200 can basically include the elements shown in FIG. 3 for supporting the translation-based communication service of the present invention as described above. Further, the first network packing/unpacking support unit 165 of the first controller 160 and the second network packing/unpacking support unit 265 of the second controller 260 described above with reference to FIG. 22 can support the packet transmission for supporting the translation-based communication service as described above with reference to FIG. 3 and the packet transmission for supporting the voice processing of the present invention.

A delay can occur in the process in which the terminals having the construction as described above according to embodiments of the present invention convert a text or voice in the first language into the second language and provide the converted text or voice in the second language. Further, when the receiver-side terminal 200 outputs a voice signal received from the transmitter-side, the output voice signal can enter the second microphone to generate an echo error. The generation of the echo error can be prevented using an echo blocking circuit. However, the terminals of the present invention can perform voice signal outputting and waiting in a manner similar to the half-duplex scheme by using a delay which can basically occur in the process of language conversion, so as to achieve outputting of a good voice signal without a separate echo blocking circuit. That is, terminals according to embodiments of the present invention can provide a half-duplex mode for supporting provision of a voice translation service of the present invention. When the half-duplex mode is activated, each of the terminals can limit the operation of the microphone so as to stop the collection of a voice signal while a translation voice translated from a signal received from a counterpart terminal is output. Further, when the outputting of the translation voice is completed, the terminals can activate the microphone to support collection of the voice signal. In this event, the terminals can output a guide message relating to the deactivation of the microphone in a voice or translation voice output section relating to the message transferred from the counterpart, and can output a guide message relating to activation of the microphone after the voice output is completed.

To this end, the terminals 100 and 200 of the present invention can include a first dialog manager 361 and a second dialog manager 362, to support collection of voice signals of users after outputting of the transmitted or received signals is completed, respectively.

In more detail, when the second network packing/unpacking support unit 265 of the receiver-side terminal 200 receives communication data from the transmitter-side, the second network packing/unpacking support unit 265 transfers the received communication data to the second reception processor 463, the second transmission processor 462, and the second dialog manager 461. Then, the second reception processor 463 provides the received communication data to the reception translation unit 464. Meanwhile, the second dialog manager 461 receives a delay signal (pullback signal) from the second reception processor 463 and transfers a transmission control signal corresponding to the received delay signal to the second transmission processor 462. When receiving data converted from the communication data from the reception translation unit 464, the second reception processor 463 outputs the converted data through the second speaker. Meanwhile, the second transmission processor 462 having received the transmission control signal from the second dialog manager 461 can control the activation/deactivation in the second microphone and collection of the voice signal according to the transmission control signal. Especially, while the second reception processor 463 receives communication data, converts the received communication data to a voice signal in the second language for the receiver-side terminal 200, and outputs the converted voice signal, the second transmission processor 462 can prevent the second microphone from collecting the voice signal, so as to prevent the voice signal to be transmitted and the received and output voice signal from overlapping each other.

Meanwhile, the first dialog manager 361 also can control the activation time point of the first microphone in the process of receiving and outputting particular communication data from the receiver-side terminal 200, so prevent the voice signal to be transmitted from being collected while the communication data provided by the receiver-side terminal 200 is being output. Further, a voice signal collected by the first microphone is transferred to the first transmission processor 362, and the first transmission processor 362 transfers the received voice signal to the receiver-side terminal 200 through the first network packing/unpacking support unit 165.

Meanwhile, in the above description, the communication data can include at least one of voice and message and can be data made based on the first language operated in the transmitter-side terminal 100 in view of the receiver-side terminal 200. In contrast, in view of the transmitter-side terminal 100, the communication data can be data made based on the second language operated in the receiver-side terminal 200. The reception translation unit 464 can convert voice or SMS data in the first language to voice data in the second language and then transfer the converted voice data to the second reception processor 463. Especially, when receiving communication data in the form of a text from the transmitter-side terminal, the reception translation unit 464 first converts the received communication data to text data in the second language and then converts the converted text data to voice data in the second language.

Figure 23:
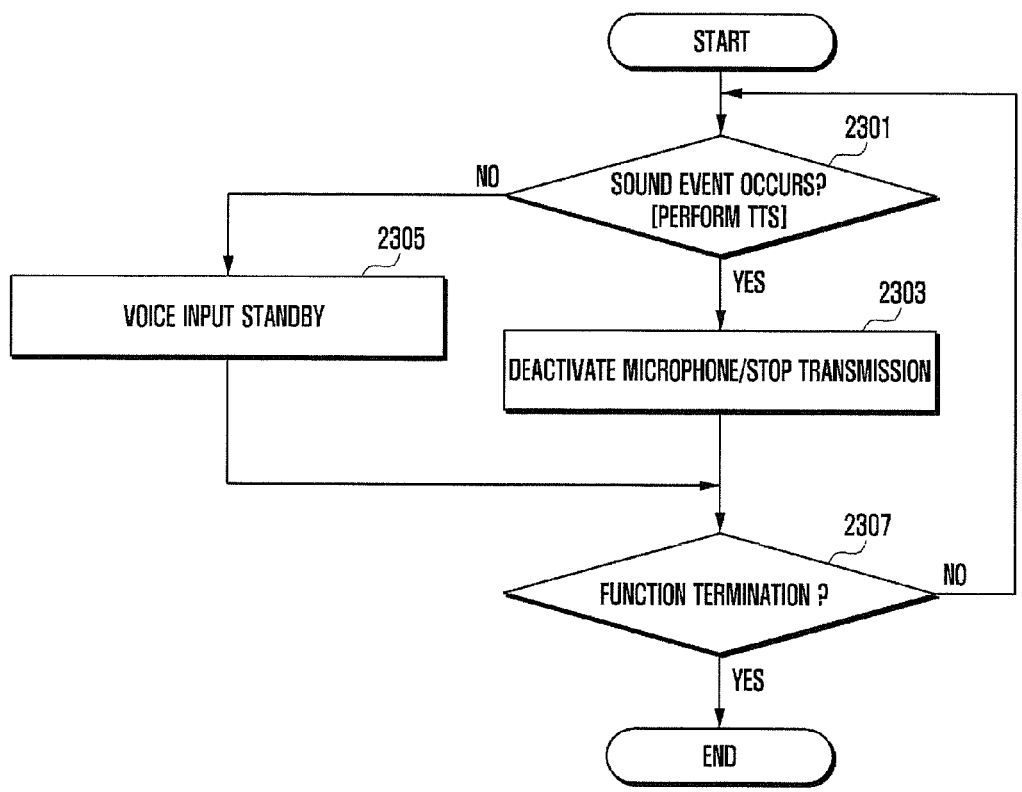
FIGS. 23 to 25 flowcharts for describing dialog management in the process of supporting a communication service according to an embodiment of the present invention.
Figure 24:
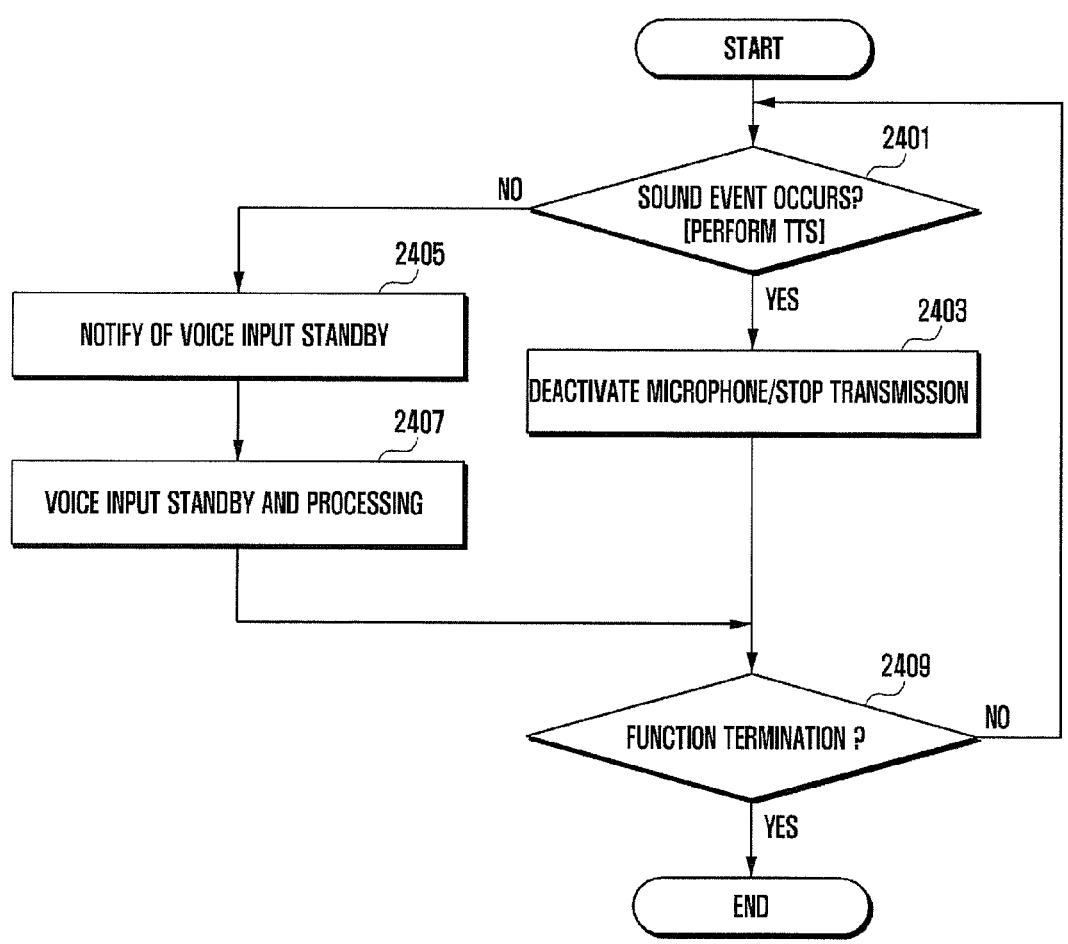
Figure 25:
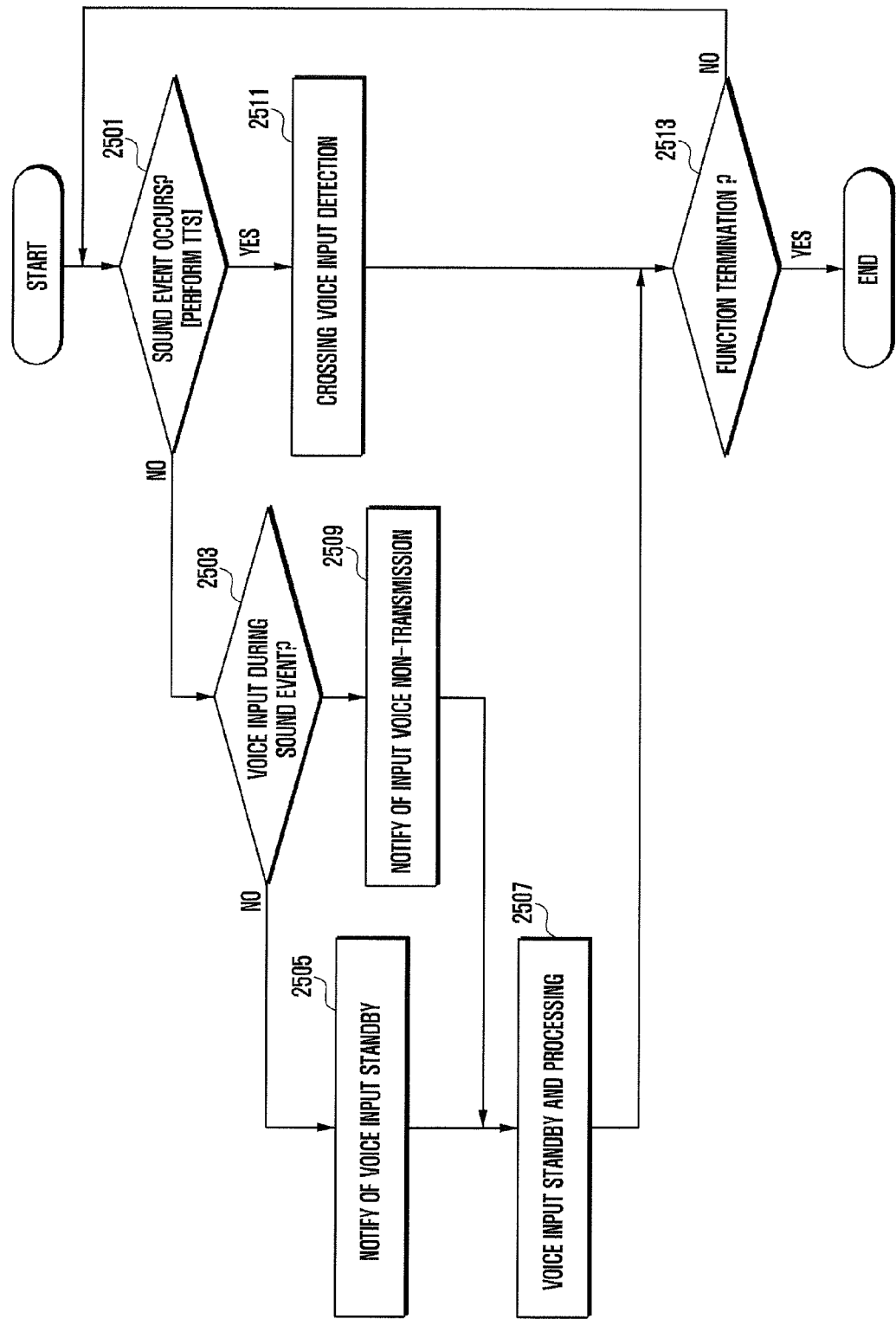

FIGS. 23 to 25 are flowcharts for describing dialog management in the process of supporting a communication service according to an embodiment of the present invention.

First, FIG. 23 is a flowchart for describing a first method for dialog management by a receiver-side terminal according to an embodiment of the present invention.

Referring to FIG. 23, in the first method for dialog management by a receiver-side terminal of the present invention, the second dialog manager 461 determines whether a sound event occurs in step 2301. The sound event can be an event for TTS reproduction and, more particularly, can be an event requesting a text in the first language to be output as a voice signal in the second language.

As a result of the determination in this step, when a sound event occurs, that is, when text data in the first language is received from the transmitter-side, the second dialog manager 461 can support deactivation of the microphone and interruption of the transmission of the voice signal in step 2303. That is, the second dialog manager 461 supports temporary interruption of the collection and transmission of the voice signal of the user. In this event, the second reception processor 463 performs a processing for converting the received text data in the first language to a voice signal in the second language through the reception translation unit 464. Further, when receiving a voice signal in the second language from the reception translation unit 464, the second reception processor 463 supports outputting of the received voice signal through the second microphone. The reception translation unit 464 can be either a translation module configured in the receiver-side terminal 200 or a sever device designed to use a service through a separate network connection.

Meanwhile, as a result of the determination in step 2301, when a sound event does not occur, the second dialog manager 461 can support voice input waiting and processing in step 2305. That is, the second dialog manager 461 activates a microphone to collect a voice signal of a user, and then processes the collected voice signal to be transmitted to the transmitter-side terminal 100.

Thereafter, the receiver-side terminal 200 determines whether an event for termination of the communication function occurs in step 2307. When the event does not occur, the receiver-side terminal 200 returns to and performs the process again from step 2301. Meanwhile, when an event for termination of the communication function occurs, the receiver-side terminal 200 terminates the communication function and performs a particular terminal function according to a preconfigured schedule information or a user input.

FIG. 24 is a flowchart for describing a second method for dialog management by a receiver-side terminal according to an embodiment of the present invention.

Referring to FIG. 24, in the second method for dialog management by a receiver-side terminal of the present invention, the second dialog manager 461 of the receiver-side terminal 200 determines whether a sound event occurs in step 2401. As a result of the determination in step 2401, when a sound event occurs, the receiver-side terminal 200 deactivates the microphone and stops the transmission in order to support the event in step 2403. Further, in step 2409, the receiver-side terminal 200 determines whether an event for termination of the communication function occurs. According to a result of the determination, the receiver-side terminal 200 can return to and perform the process again from step 2401. Steps 2401, 2403, and 2409 can be actually the same as steps 2301, 2303, and 2307 as described above, respectively. Therefore, detailed description of those steps is omitted here.

Meanwhile, as a result of the determination in step 2401, when a sound event does not occur, the receiver-side terminal 200 can notify of voice input standby in step 2405. That is, the receiver-side terminal 200 can output a guide message for notifying a user of a vocalizable situation in the second display unit 240 or provide an equivalent indication, such as lamp flickering, particular vibration pattern outputting, or particular sound effect or guide sound outputting. Further, the receiver-side terminal 200 may perform sound input standby and processing in step 2407. Step 2407 for the sound input standby and processing can be actually the same as step 2305 described above with reference to FIG. 23.

FIG. 25 is a flowchart for describing a third method for dialog management by a receiver-side terminal according to an embodiment of the present invention.

Referring to FIG. 25, in the third method for dialog management by a receiver-side terminal of the present invention, the second controller 260 of the receiver-side terminal 200 determines whether a sound event occurs in step 2501. When a sound event does not occur, the second controller 260 proceeds to step 2503 in which the second controller 260 determines whether a voice input occurs during the sound event. That is, the second controller 260 of the receiver-side terminal 200 determines whether a voice input occurs in the process in which a text data in the first language is received and is then translated. Then, when a voice input does not occur during the sound event, the receiver-side terminal 200 proceeds to step 2505 in which the receiver-side terminal 200 notifies of voice input standby and then performs voice input standby and processing. Steps 2505 and 2507 can be actually the same as steps 2405 and 2407 as described above with reference to FIG. 24, respectively. Meanwhile, as a result of the determination in step 2503, when a voice input occurs during the sound event, the second controller 260 of the receiver-side terminal 200 proceeds to step 2509 in which the receiver-side terminal 200 notifies of input voice non-transmission. That is, the second controller 260 can notify of a message, reporting that a voice received during the processing of the sound event is not processed and a voice signal corresponding to the voice is not transmitted to the transmitter-side terminal 100, through at least one in the second display unit 240, a vibration, a lamp, and the second speaker.

As a result of the determination in step 2501, when a sound event occurs, the second controller 260 can perform crossing voice input detection in step 2511. That is, the second controller 260 determines whether there is a voice signal collected through the second microphone while outputting voice data in the second language through the second speaker. In this event, even when there is a voice signal collected through the second microphone, the voice signal is not processed. Then, the second controller 260 outputs a message, reporting that a voice signal vocalized by the user is not collected or that the second microphone is in a deactivated state, through a means recognizable by the user.

Next, the receiver-side terminal 200 supports termination of the process or returning to the start of the process based on a determination on whether to terminate the communication function in step 2513.

Figure 26:
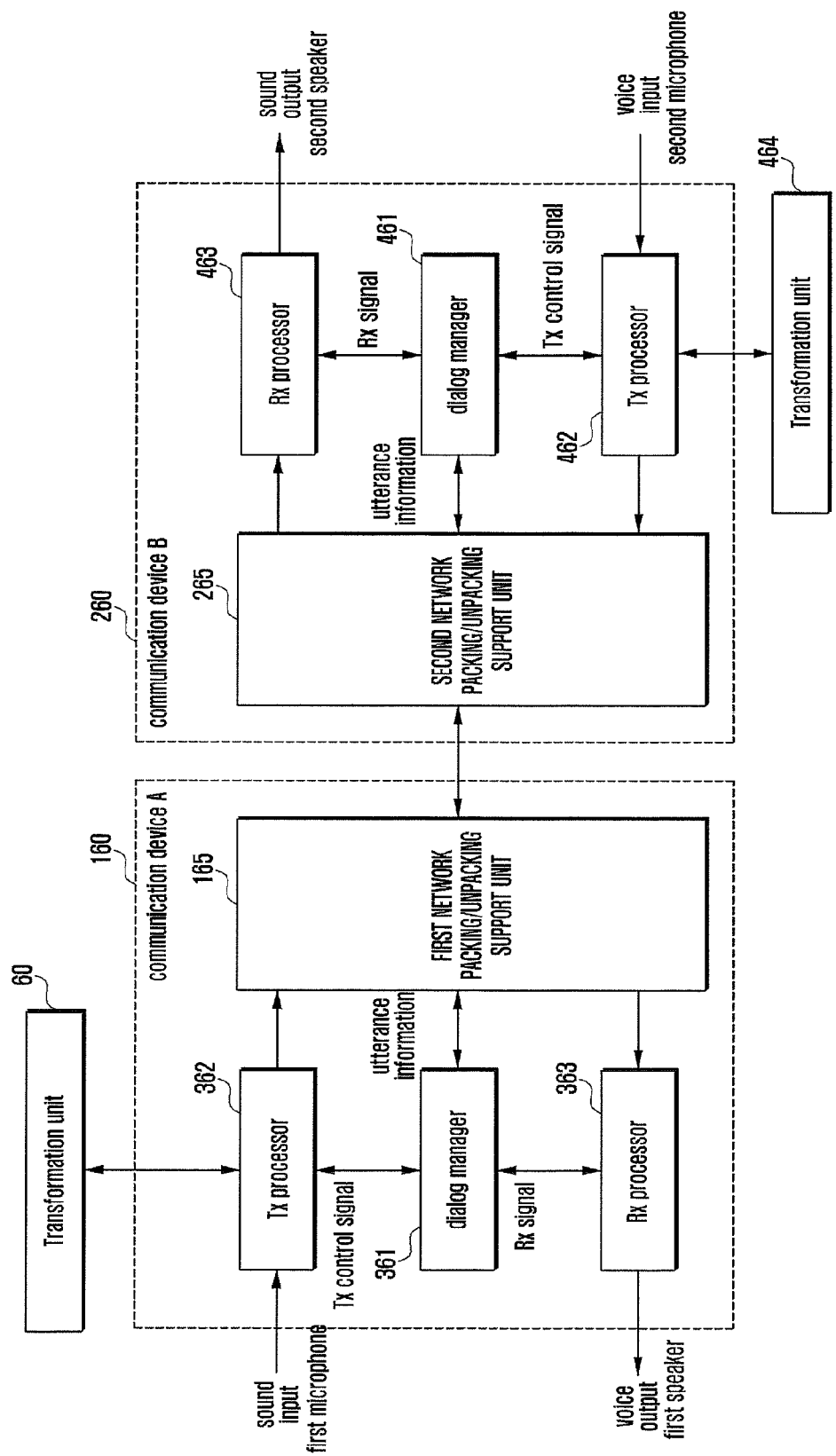
FIG. 26 is a block diagram illustrating the controller configuration of and signal flow between terminals for describing dialog management by a transmitter-side terminal in a process of supporting a communication service according to an embodiment of the present invention.

FIG. 26 is a block diagram illustrating the controller configuration of and signal flow between terminals for describing dialog management by a transmitter-side terminal in a process of supporting a communication service according to an embodiment of the present invention.

When the function of converting a text in the first language to a voice signal in the second language is performed by the receiver-side terminal 200, the receiver-side terminal 200 can acquire the exact vocalization termination time point. However, when the signal conversion function is performed by the transmitter-side terminal 100, the receiver-side terminal 200 is unable to acquire the exact vocalization termination time point. In order to solve this problem, the present invention can support analysis of a voice section from a signal provided by and received from a transmitter-side terminal to exactly identify the voice section. Further, since the transmitter-side terminal 100 can acquire an exact vocalization start time point and an exact vocalization termination time point, the transmitter-side terminal 100 includes information of the exact vocalization start time point and the exact vocalization termination time point in the communication data transmitted to the receiver-side terminal 200. Therefore, the receiver-side terminal 200 can identify time information on the vocalization section in the received communication data to determine the degree of deactivation of a microphone.

To this end, when the first microphone collects a voice signal, the first transmission processor 362 of the transmitter-side terminal 100 transfers the collected voice signal to the first network packing/unpacking support unit 165. In this event, the first dialog manager 361 collects information on the vocalization start time point and the vocalization termination time point of the voice signal collected by the first transmission processor 362 and transfers the collected vocalization information to the first network packing/unpacking support unit 165, so as to transfer the vocalization information together with the communication data to the receiver-side terminal 200. In this event, the first transmission processor 362 of the transmitter-side terminal 100 translates the voice signal provided by the first microphone 131 into the second language of the receiver-side terminal 200 by using the translation unit 60, and then transfers the translated voice signal to the first network packing/unpacking support unit 165.

When receiving vocalization information provided by the transmitter-side terminal 100, the receiver-side terminal 200 can previously acquire the length of the voice section based on the received vocalization information and can interrupt the collection and transmission of the voice signal during the voice section. Meanwhile, when the transmitter-side terminal 100 does not provide vocalization information, the receiver-side terminal 200 analyzes the voice section in the received signal to determine whether it is in a voice activation section, for a pertinent control of the terminal. That is, when the second network packing/unpacking support unit 265 transfers a signal provided by the transmitter-side terminal 100 to the second reception processor 463, the second dialog manager 461 analyzes the voice signal processed by the second reception processor 463 to analyze the voice section, and then supports the voice signal transmission in the second transmission processor 462 and the activation control in the second microphone according to a result of the analysis of the voice section. The second transmission processor 462 is activated under the control in the second dialog manager 461 to translate a voice signal in the second language provided by the second microphone 231 into a voice signal in the first language and then provide the translated voice signal to the transmitter-side terminal 100.

Figure 27:
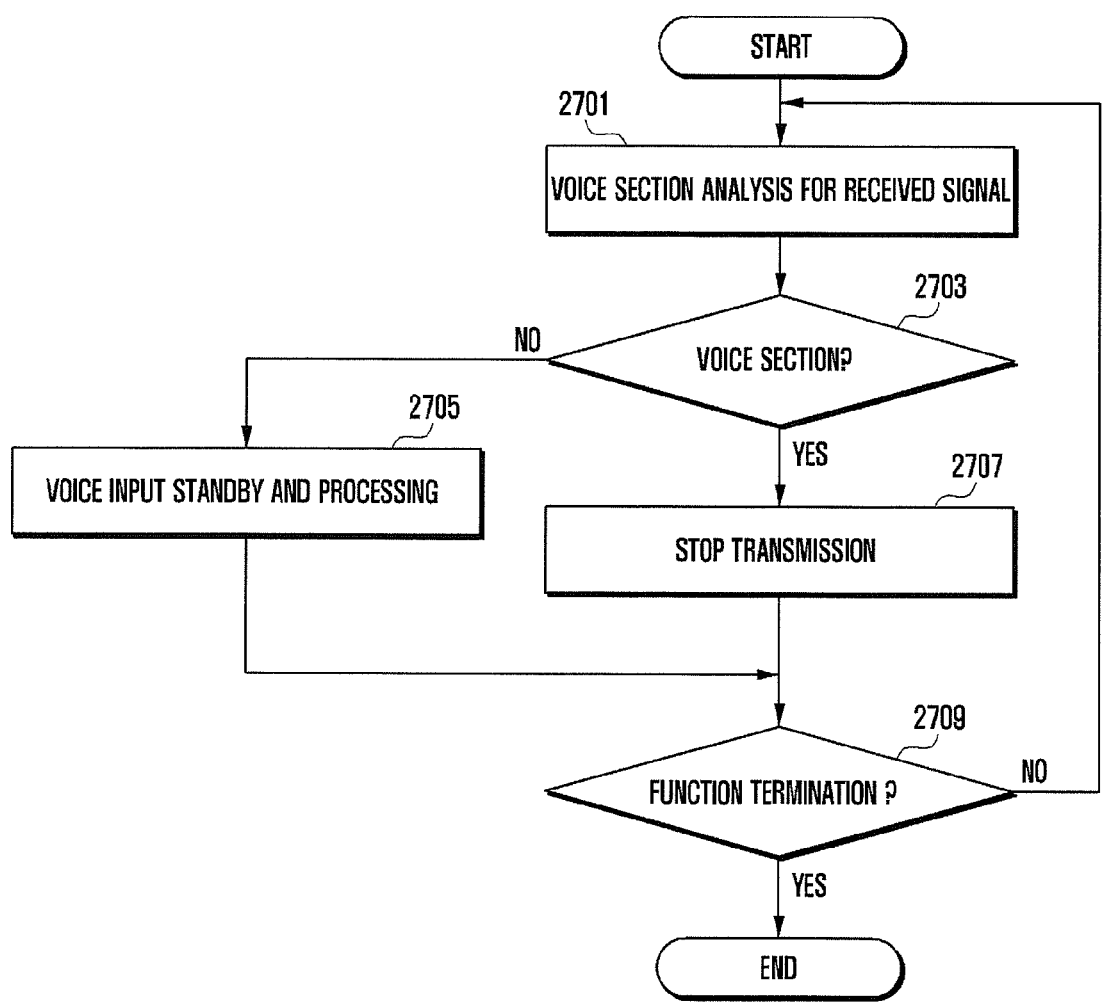
FIGS. 27 and 28 are flowcharts for describing a dialog management method of terminals relating to voice section information for supporting a communication service.
Figure 28:
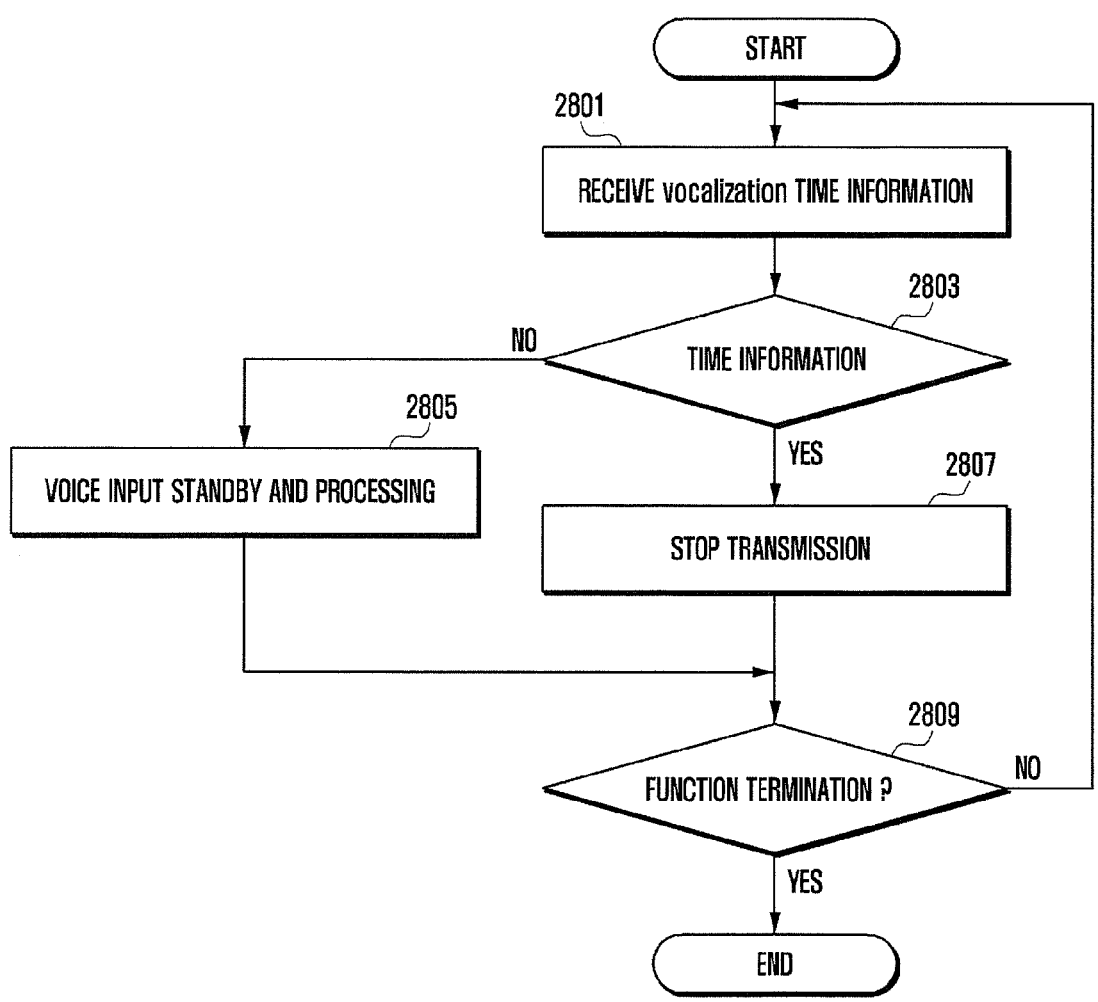

FIGS. 27 and 28 are flowcharts for describing a dialog management method of terminals relating to voice section information for supporting a communication service.

Especially, FIG. 27 is a flowchart for describing a fourth method for dialog management by a receiver-side terminal according to an embodiment of the present invention.

Referring to FIG. 27, the receiver-side terminal 200 analyzes a voice section for a received signal in step 2701. To this end, the second dialog manager 461 analyzes a voice section of information received by the second reception processor 463 from the second network packing/unpacking support unit 265. Thereafter, the receiver-side terminal 200 determines whether the current time point is a time point in the voice section, in step 2703. When it is not a time point in the voice section, the receiver-side terminal 200 proceeds to step 2705, in which the receiver-side terminal 200 supports voice input standby and processing. That is, the receiver-side terminal 200 activates the second microphone to allow a user to input a voice. In this event, the receiver-side terminal 200 can support outputting of a guide message reporting that a voice signal of the user can be collected.

Meanwhile, as a result of the determination in step 2703, when the current time point is a time point in the voice section, that is, when the communication data provided by the transmitter-side terminal 100 is being received, the second controller 260 of the receiver-side terminal 200 proceeds to step 2707, in which the receiver-side terminal 200 supports temporary interruption of the transmission of the voice signal. In this event, the second controller 260 can support outputting of a guide message reporting the temporary interruption of the transmission of the voice signal.

Next, in step 2709, the receiver-side terminal 200 determines whether an event for termination of the communication function occurs. According to a result of the determination, the receiver-side terminal 200 can support the termination of the process or the returning to step 2701 for supporting the communication function.

FIG. 28 is a flowchart for describing a fifth method for dialog management by a receiver-side terminal according to an embodiment of the present invention.

Referring to FIG. 28, in the fifth method for dialog management by a receiver-side terminal of the present invention, the receiver-side terminal receives vocalization information from another terminal in step 2801. To this end, when the second reception processor 463 receives communication data from the second network packing/unpacking support unit 265, the second dialog manager 461 of the receiver-side terminal 200 can support parsing of vocalization information included in the data. The vocalization information can include information on a start time point and a termination time point of collection of voice data by the transmitter-side terminal 100. Otherwise, the vocalization information can include information of a predetermined lapsed time corresponding to a voice signal output of communication data provided by the transmitter-side terminal 100.

When receiving the vocalization information, the receiver-side terminal 200 determines whether the current time point is a time point in the voice section, in step 2803. When it is not a time point in the voice section, the receiver-side terminal 200 proceeds to step 2805, in which the receiver-side terminal 200 supports voice input standby and processing. For the voice input standby and processing, the receiver-side terminal 200 activates the second microphone, translates a voice signal collected by the second microphone into the first language, and then transmits the translated voice signal. In this event, the receiver-side terminal 200 can support outputting of a message reporting the voice input standby state.

Meanwhile, as a result of the determination in step 2803, when the current time point is a time point in the voice section of the received signal, the receiver-side terminal 200 interrupts the collection and transmission of the voice signal by the second microphone in step 2807. Next, the receiver-side terminal 200 can support termination of the process or returning to step 2801, based on a determination on whether to terminate the communication function in step 2809.

As described above, in a method of operating a translation-based communication service according to an embodiment of the present invention, at least one type of input information among a text, a voice signal, and handwriting information input during the operation of the communication service is converted to translation information, and the converted translation information is provided to the receiver-side terminal. Therefore, the present invention can solve the problem of communication trouble due to the language discord between the transmitter-side terminal 100 and the receiver-side terminal 200.

Further, the communication service operation method of the present invention can support a signal processing similar to the half-duplex scheme, which can suppress the occurrence of echo by using the delay time lapsed in the signal conversion process.

Meanwhile, the transmitter-side terminal and the receiver-side terminal as described above can further include various additional modules according to provision forms thereof. That is, the terminals can further include components which have not been mentioned above, such as a short distance communication module for short distance communication, an interface for data transmission/reception by a wired communication scheme or a wireless communication scheme of the terminals, an Internet communication module for communicating with an Internet network to perform an Internet function, and a digital broadcasting module for performing a function of receiving and reproducing digital broadcasting. It is difficult to list all of such components since they are variously modified according to a convergence trend of digital devices, but components in the same level as that of the aforementioned components may be further included in the terminal. Further, it is apparent that particular components in the terminal according to the present invention can be excluded from the components or replaced with other components. This will be easily understood by those skilled in the art.

In addition, the terminals according to embodiments of the present invention may include all information technology devices and multimedia devices, such as a Portable Multimedia Player (PMP), a digital broadcasting player, a Personal Digital Assistant (PDA), a music player (for example, an MP3 player), a portable game terminal, a smart phone, a notebook, and a handheld PC, and application devices thereof, as well as all mobile communication terminals operating based on communication protocols corresponding to various communication systems.

Meanwhile, although exemplary embodiments of the present invention have been shown and described in this specification and the drawings, they are used in a general sense in order to easily explain technical contents of the present invention, and to help comprehension of the present invention, and are not intended to limit the scope of the present invention. It is obvious to those skilled in the art to which the present invention pertains that other modified embodiments on the basis of the spirits of the present invention besides the embodiments disclosed herein can be carried out.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of operating a server for supporting a translation-based communication service, the method comprising:
    establishing a communication service channel between a transmitter-side terminal and a receiver-side terminal;
    receiving at least one of a text in a first language and a voice signal in the first language collected by the transmitter-side terminal with voice-related characteristic information;
    translating the at least one of the text in the first language and the voice signal in the first language into a second language;
    generating at least one of a translation text in the second language and a translation voice signal in the second language, wherein the voice-related characteristic information is used to generate the translation voice signal in the second language with a pitch and a tone similar to the voice signal in the first language; and
    transmitting at least one of the generated translation text in the second language and the translation voice signal in the second language to the receiver-side terminal.

2. The method of claim 1, wherein establishing of the communication service channel comprises at least one of:
    establishing a chatting service channel between the transmitter-side terminal and the receiver-side terminal;
    establishing a voice communication service channel between the transmitter-side terminal and the receiver-side terminal; and
    establishing a video communication service channel between the transmitter-side terminal and the receiver-side terminal.

3. The method of claim 2, further comprising:
    transmitting a voice signal in the first language collected by the transmitter-side terminal to the receiver-side terminal.

4. The method of claim 1, wherein generating of the at least one of the translation text and the translation voice signal in the second language comprises:
    converting the text in the first language to the translation text in the second language by using a translation database stored in a first storage unit by the transmitter-side terminal when collecting the text in the first language; and
    generating a voice-recognized text by using a voice recognition database stored in the first storage unit and then converting the generated voice-recognized text to the translation text in the second language by using the translation database stored in the first storage unit, by the transmitter-side terminal when collecting the voice signal in the first language.

5. The method of claim 1, further comprising:
    transmitting at least one of the text in the first language and the voice signal in the first language to the receiver-side terminal by the transmitter-side terminal,
    wherein generating of the at least one of the translation text and the translation voice signal in the second language comprises at least one of:
        converting the text in the first language to a text in the second language by using a translation database stored in a second storage unit by the receiver-side terminal; and
        generating a voice-recognized text from the voice signal in the first language by using a voice recognition database stored in the second storage unit and then converting the generated voice-recognized text to the text in the second language by using the translation database stored in the second storage unit by the receiver-side terminal.

6. The method of claim 1, wherein generating of the at least one of the translation text and the translation voice signal in the second language comprises:
    providing the text in the first language to an ASR/translation server supporting voice recognition and translation by the transmitter-side terminal, and generating translation information including at least one of the translation text in the second language and the translation voice signal in the second language corresponding to the text in the first language by the ASR/translation server; and
    transmitting the translation information to at least one of the transmitter-side terminal, the receiver-side terminal, and a chatting server supporting a chatting service between the transmitter-side terminal and the receiver-side terminal by the ASR/translation server.

7. The method of claim 1, further comprising:
    interrupting collection and transmission of the voice signal and operating a half-duplex mode by the receiver-side terminal in a voice signal outputting section; and
    supporting voice input standby and processing by the receiver-side terminal when it is not in voice signal outputting section.

8. A transmitter-side terminal for supporting a translation-based communication service, the transmitter-side terminal comprising:
    at least one of an input unit configured to receive input of a text in a first language with voice-related characteristic information and a display unit having an input function, wherein the voice related characteristic information is used to generate a translation voice signal in a second language with a pitch and a tone similar to a voice signal in the first language;
    a storage unit configured to store a translation database for translation of the text in the first language;

a controller configured to translate the text in the first language to a translation text in the second language by using the translation database; and a communication unit configured to transmit the translation text in the second language with the voice-related characteristic information.

9. The transmitter-side terminal of claim 8, wherein the controller is configured to receive language configuration information of a receiver-side terminal and generate the translation text in the second language according to the received language configuration information.

10. The transmitter-side terminal of claim 8, further comprising:

a touch panel configured to recognize a touch; and an electronic pen configured to handwrite an input on the touch panel, wherein the controller is configured to:
image-scan the handwritten input,
convert the handwritten input to a text in the first language, and
convert the converted text to a translation text in the second language.

11. The transmitter-side terminal of claim 8, wherein the storage unit comprises a voice-for-TTS database configured to convert the translation text in the second language to a voice in the second language, and the controller is configure to use the voice-for-TTS database to generate the voice in the second language.

12. The transmitter-side terminal of claim 8, wherein a display unit is configured to provide at least one of an icon or a menu item for selection of a translation mode, and the controller is configured to select language configuration information of a receiver-side terminal that is communication-connected with the communication unit when the translation mode is selected.

13. The transmitter-side terminal of claim 8, wherein the display unit is configured to output the text in the first language and the translation text in the second language.

14. The transmitter-side terminal of claim 8, further comprising:

a microphone supporting collection of a voice signal in the first language, wherein the storage unit comprises a voice recognition database for voice recognition of the voice signal in the first language.

15. The transmitter-side terminal of claim 14, wherein when the voice signal in the first language is collected, the controller performs a control to generate a voice-recognized text by using the voice recognition database and translate the generated voice-recognized text to generate a translation text in the second language.

16. The transmitter-side terminal of claim 15, wherein the controller performs a control to extract sound characteristics of the voice signal in the first language and apply the extracted sound characteristics to convert the translation text in the second language to a voice.

17. A receiver-side terminal for supporting a translation-based communication service, the receiver-side terminal comprising:

a communication unit configured to receive a text in a first language with voice-related characteristic information, wherein the voice-related characteristic information is used to generate a translation voice signal in a second language with a pitch and a tone similar to a voice signal in the first language;

a storage unit configured to store a translation database for conversion of the received text in the first language to a translation text of the second language;

a display unit configured to output the translation text in the second language; and a controller configured to perform a control to convert the text in the first language to the translation text in the second language and then output the converted translation text.

18. The receiver-side terminal of claim 17, wherein the communication unit is configured to receive a voice signal in the first language, the storage unit comprises a voice recognition database for voice recognition of the voice signal in the first language, and the controller is further configured to:
perform a control to generate a voice-recognized text by voice-recognizing the voice signal in the first language by using the voice recognition database,
convert the voice-recognized text to a translation text in the second language, and
output the converted translation text.

19. The receiver-side terminal of claim 17, wherein the storage unit comprises a voice-for-TTS database for conversion of the translation text in the second language to the translation voice signal in the second language, and the controller is configured to control to use the voice-for-TTS database to generate the translation voice signal in the second language corresponding to the translation text in the second language.

20. The receiver-side terminal of claim 19, further comprising:

a speaker configured to output the translation voice signal in the second language.

21. The receiver-side terminal of claim 17, wherein the display unit is configured to output the text in the first language and the translation text in the second language.

22. A server for supporting a translation-based communication service, the system comprising:

a communication unit configured to transmit and receive a signal; and one or more processors operably connected to the communication unit, the one or more processors configured to:

establish, by controlling the communication unit, a communication service channel between transmitter-side terminal and a receiver-side terminal, receive, by controlling the communication unit, at least one of a text in a first language and a voice signal in the first language collected by the transmitter-side terminal with voice-related characteristic information, translate the at least one of the text in the first language and the voice signal in the first language into a second language, generate at least one of the translated text in the second language and the translated voice signal in the second language, wherein the voice-related characteristic information is used to generate the translation voice signal in the second language with a pitch and a tone similar to the voice signal in the first language, and transmit, by controlling the communication unit, the generated at least one of the translation text and the translation voice signal in the second language to the receiver-side terminal.

23. The server of claim 22, wherein to establish the communication service channel comprises at least one of:
establish a chatting service channel between the transmitter-side terminal and the receiver-side terminal;
establish a voice communication service channel between the transmitter-side terminal and the receiver-side terminal; and
establish a video communication service channel between the transmitter-side terminal and the receiver-side terminal.

24. The server of claim 23, wherein the one or more processors are further configured to:
transmit a voice signal in the first language collected by the transmitter-side terminal to the receiver-side terminal.

25. The server of claim 22, wherein to generate of the at least one of the translation text and the translation voice signal in the second language comprises:
convert the text in the first language to the translation text in the second language by using a translation database stored in a first storage unit by the transmitter-side terminal when collecting the text in the first language; and
generate a voice-recognized text by using a voice recognition database stored in the first storage unit and then converting the generated voice-recognized text to the translation text in the second language by using the translation database stored in the first storage unit, by the transmitter-side terminal when collecting the voice signal in the first language.

26. The server of claim 22, wherein the one or more processors are further configured to:
transmit at least one of the text in the first language and the voice signal in the first language to the receiver-side terminal by the transmitter-side terminal,
wherein to generate of the at least one of the translation text and the translation voice signal in the second language comprises at least one of:
converting the text in the first language to a text in the second language by using a translation database stored in a second storage unit by the receiver-side terminal; and
generating a voice-recognized text from the voice signal in the first language by using a voice recognition database stored in the second storage unit and then converting the generated voice-recognized text to the text in the second language by using the translation database stored in the second storage unit by the receiver-side terminal.

27. The server of claim 22, wherein to generate of the at least one of the translation text and the translation voice signal in the second language comprises:
provide the text in the first language to an ASR/translation server supporting voice recognition and translation by the transmitter-side terminal, and generating translation information including at least one of the translation text in the second language and the translation voice signal in the second language corresponding to the text in the first language by the ASR/translation server; and
transmit the translation information to at least one of the transmitter-side terminal, the receiver-side terminal, and a chatting server supporting a chatting service between the transmitter-side terminal and the receiver-side terminal by the ASR/translation server.

28. The server of claim 22, wherein the one or more processors are further configured to:
interrupt collection and transmission of the voice signal and operating a half-duplex mode by the receiver-side terminal in a voice signal outputting section; and
support voice input standby and processing by the receiver-side terminal when it is not in voice signal outputting section.

29. A method of operating a transmitter-side terminal for supporting a translation-based communication service, the transmitter-side terminal comprising:
receiving input of a text in a first language with voice-related characteristic information and a display unit having an input function, wherein the voice related characteristic information is used to generate a translation voice signal in a second language with a pitch and a tone similar to a voice signal in the first language;
translating the text in the first language to a translation text in the second language by using a translation database stored in the transmitter-side terminal; and
transmitting the translation text in the second language with the voice-related characteristic information.

30. The method of claim 29, further comprising:
receiving language configuration information of a receiver-side terminal; and
generating the translation text in the second language according to the received language configuration information.

31. The method of claim 29, further comprising:
recognizing a touch from a touch panel, wherein the touch is performed using an electric pen; and
image-scanning the handwritten input,
converting the handwritten input to a text in the first language, and
converting the converted text to a translation text in the second language.

32. The method of claim 29, further comprising:
converting the translation text in the second language to a voice in the second language using a voice-for-TTS database, and
generating the voice in the second language using the voice-for-TTS database.

33. The method of claim 29, further comprising:
providing at least one of an icon or a menu item for selection of a translation mode, and
selecting language configuration information of a receiver-side terminal that is communication-connected with the communication unit when the translation mode is selected.

34. The method of claim 29, further comprising outputting the text in the first language and the translation text in the second language.

35. The method of claim 29, further comprising:
collecting a voice signal in the first language using a microphone,
providing voice recognition of the voice signal in the first language using a voice recognition database.

36. The method of claim 35, wherein, when the voice signal in the first language is collected, generating a voice-recognized text by using the voice recognition database and translating the generated voice-recognized text to generate a translation text in the second language.

37. The method of claim 36, further comprising extracting sound characteristics of the voice signal in the first language and apply the extracted sound characteristics to convert the translation text in the second language to a voice.

38. A method of operating a receiver-side terminal for supporting a translation-based communication service, the receiver-side terminal comprising:

receiving a text in a first language with voice-related characteristic information, wherein the voice-related characteristic information is used to generate a translation voice signal in a second language with a pitch and a tone similar to a voice signal in the first language;

a storage unit configured to store a translation database for conversion of the received text in the first language to a translation text of the second language;

outputting the translation text in the second language;

converting the text in the first language to the translation text in the second language, and outputting the converted translation text.

39. The method of claim 38, further comprising:

performing voice recognition of the voice signal in the first language using a voice recognition database, and generating a voice-recognized text by voice-recognizing the voice signal in the first language by using the voice recognition database, converting the voice-recognized text to a translation text in the second language, and outputting the converted translation text.

40. The method of claim 38, further comprising:

converting the translation text in the second language to a voice in the second language using a voice-for-TTS database, and generating the voice in the second language using the voice-for-TTS database.

41. The method of claim 40, further comprising outputting the translation voice signal in the second language using a speaker.

* * * * *